United States Patent
Mitsui et al.

(10) Patent No.: US 9,280,015 B2
(45) Date of Patent: Mar. 8, 2016

(54) LIQUID CRYSTAL DISPLAY DEVICE AND ELECTRONIC APPARATUS PROVIDED THEREWITH

(71) Applicant: Japan Display Inc., Tokyo (JP)

(72) Inventors: Masashi Mitsui, Tokyo (JP); Masaya Tamaki, Tokyo (JP); Yoko Fukunaga, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/198,263

(22) Filed: Mar. 5, 2014

(65) Prior Publication Data

US 2014/0267982 A1 Sep. 18, 2014

(30) Foreign Application Priority Data

Mar. 14, 2013 (JP) ................................ 2013-051957

(51) Int. Cl.
*G02F 1/1335* (2006.01)
*G02B 5/02* (2006.01)
*G02F 1/13363* (2006.01)

(52) U.S. Cl.
CPC ........ *G02F 1/133504* (2013.01); *G02B 5/0257* (2013.01); *G02B 5/0289* (2013.01); *G02F 1/133524* (2013.01); *G02F 1/133555* (2013.01);
(Continued)

(58) Field of Classification Search
CPC ............... G02B 5/0257; G02B 5/0289; G02F 2001/133541; G02F 2001/133638; G02F 1/133504; G02F 1/133524; G02F 1/13355
USPC ....................................................... 349/112
See application file for complete search history.

(56) References Cited

U.S. PATENT DOCUMENTS

| 6,933,994 B1 * | 8/2005 | Kaneko ............. G02F 1/133504 349/112 |
| 2003/0107689 A1 * | 6/2003 | Park et al. ........................ 349/64 |

(Continued)

FOREIGN PATENT DOCUMENTS

| JP | 11-273438 | 10/1999 |
| JP | 2005-274690 | 10/2005 |
| JP | 2007-114756 | 5/2007 |

(Continued)

OTHER PUBLICATIONS

Taiwan Office Action issued Jul. 29, 2015 in corresponding Taiwan Appication No. 103105704.

(Continued)

*Primary Examiner* — Charles Chang
(74) *Attorney, Agent, or Firm* — K&L Gates LLP

(57) ABSTRACT

A liquid crystal display device includes a first substrate provided with a reflective electrode, a second substrate provided with a transparent electrode oppositely disposed to the reflective electrode, a liquid crystal layer disposed between the first second substrates, a polarization plate oppositely disposed to the first substrate with an interposition of the second substrate, and an anisotropic scattering member disposed between the second substrate and the polarization plate. A main view angle direction is set as a predetermined direction intersecting a display surface. The anisotropic scattering member has a scattering center and scatters light traveling along a scattering axis direction which is a direction having a predetermined angle range centered around the scattering center. The scattering axis direction coincides with the main view angle direction.

14 Claims, 19 Drawing Sheets

(52) U.S. Cl.
CPC ............... *G02F 2001/133541* (2013.01); *G02F 2001/133638* (2013.01)

(56) References Cited

U.S. PATENT DOCUMENTS

2004/0141119 A1 7/2004 Iijima
2012/0250158 A1 10/2012 Tamaki et al.

FOREIGN PATENT DOCUMENTS

| JP | 2007-249181 | 9/2007 |
| JP | 2007-249182 | 9/2007 |
| JP | 2007-258152 | 10/2007 |
| JP | 2008-052132 | 3/2008 |
| JP | 2012-155068 | 8/2012 |
| KR | 10-2004-0045362 | 6/2004 |
| KR | 10-2012-0112063 | 10/2012 |
| TW | 201300883 | 1/2013 |

OTHER PUBLICATIONS

Korean Office Action mailed Mar. 19, 2015 for corresponding Korean Appln. No. 10-2014-29748.
Japanese Office Action issued Dec. 22, 2015 in corresponding Japanese Application No. 2013-051957.

\* cited by examiner

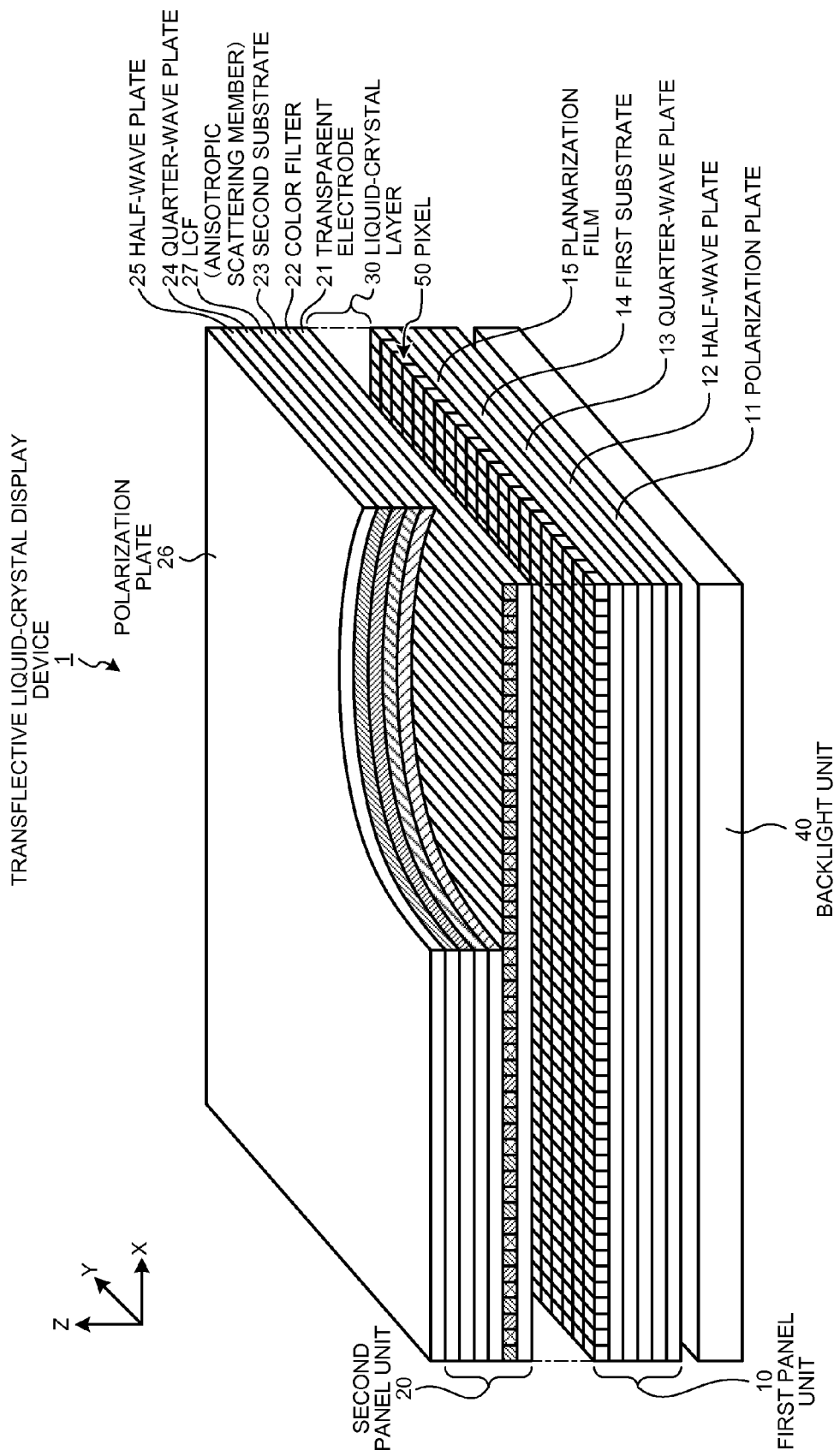

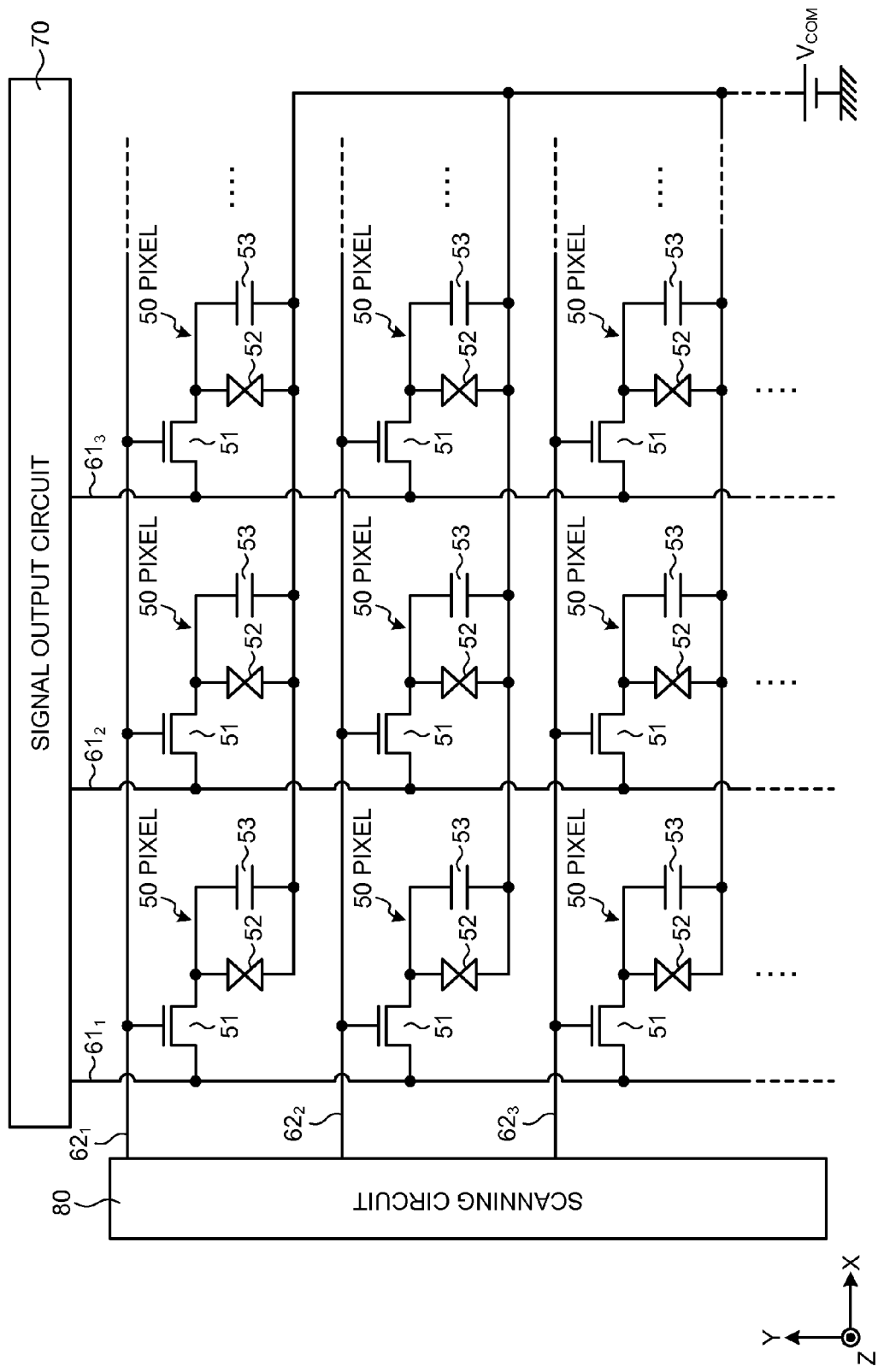

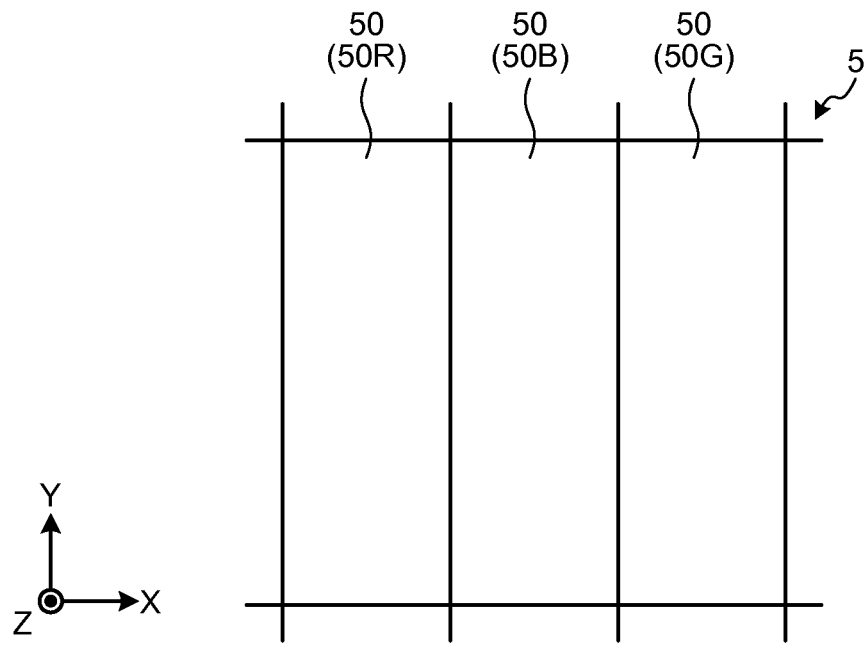
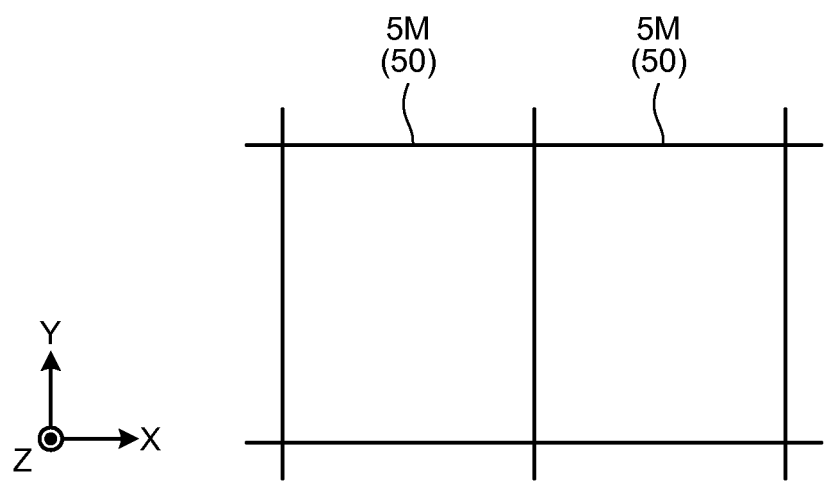

27B  27S

141 UPPER HOUSING
144 DISPLAY
142 LOWER HOUSING

141 UPPER HOUSING
142 LOWER HOUSING

LIQUID CRYSTAL DISPLAY DEVICE AND ELECTRONIC APPARATUS PROVIDED THEREWITH

CROSS REFERENCES TO RELATED APPLICATIONS

The present application claims priority to Japanese Priority Patent Application JP 2013-051957 filed in the Japan Patent Office on Mar. 14, 2013, the entire content of which is hereby incorporated by reference.

BACKGROUND

1. Field of the Invention

The present invention relates to a liquid crystal display (LCD) device and an electronic apparatus provided therewith.

2. Description of the Related Art

As a display device, there is known a reflective type display device for displaying an image by using reflected light of incident light entered from outside, as well as a transmissive type display device for displaying an image using transmitted light of backlight from a rear surface of a screen. The reflective type display device has advantageous features such as low power consumption and viewable screen or monitor even in bright environment. Furthermore, as a display device having a feature of the reflective type display device and a feature of the transmissive type display device, there is known a transflective type liquid crystal display device. In the transflective type liquid crystal display device, an image is displayed by using a backlight in a dark environment, or an image is displayed by using reflected light of external light in a bright environment.

There have been proposed some display devices in which an anisotropic scattering film such as Light Control Film (LCF) capable of increasing the reflectance of light is disposed at an observation surface side of the display device in order to improve an illuminance of an image (Japanese Patent Application Laid-open Nos. 2007-249182, 2007-249181, and 2007-114756). The anisotropic scattering film has a scattering center (scattering central axis) in a direction inclined by a predetermined angle from a normal line direction of the observation surface of the display device. The light transmitted through the anisotropic scattering film along the scattering center becomes scattered light. In order to improve a view angle effect (view angle dependency) of the display device, the scattering center is directed so that the contrast ratio of the display device is maximized.

In some display devices, there is proposed a direct backlight unit as a backlight unit disposed at a rear surface of the screen (Japanese Patent Application Laid-open No. 2008-52132). In the backlight unit, an anisotropic light diffusing adhesive layer is disposed between a light diffusion plate and a rod-like light source. In order to obtain a uniform light from an irradiation surface of the light diffusion plate, a longitudinal direction of needle-like filler contained in the anisotropic light diffusing adhesive layer and a tube axis direction of the rod-like light source are directed to an approximately same direction.

In the reflective type display device or the transflective type display device for displaying an image by using a reflected light of an external light, the reflected light emitted from a light emitting surface is transmitted through an anisotropic scattering member such as an anisotropic scattering film, when such an anisotropic scattering member is disposed on the light emitting surface from which the reflected light is emitted. In this case, if there is a gap between the light emitting surface and the anisotropic scattering member, a light path length of the reflected light becomes longer. Thereby, the reflected light is likely to expand in a surface or plane and it causes a blurred image. Furthermore, when an emitting direction of the reflected light emitted from the light emitting surface crosses the scattering center of the anisotropic scattering member at a considerable angle, the reflected light is emitted without scattering due to a property of the anisotropic scattering member. Thereby, the directional dependency of the reflected light is increased.

SUMMARY

It is an object of the present invention to at least partially solve the problems in the conventional technology.

There is provided a liquid crystal display device including a first substrate provided with a reflective electrode, a second substrate provided with a transparent electrode, the transparent electrode oppositely disposed to the reflective electrode, a liquid crystal layer disposed between the first substrate and the second substrate, a polarization plate oppositely disposed to the first substrate with an interposition of the second substrate therebetween, and an anisotropic scattering member disposed between the second substrate and the polarization plate, wherein a main view angle direction is set as a predetermined direction intersecting a display surface, the anisotropic scattering member has a scattering center and scatters light traveling along a scattering axis direction which is a direction having a predetermined angle range centered around the scattering center, the scattering axis direction coincides with the main view angle direction.

There is provided an electronic apparatus provided with such a liquid crystal display device.

In the liquid crystal display device having the aforementioned structure and the electronic apparatus such a liquid crystal display device, it is possible to dispose the anisotropic scattering member between the second substrate and the polarization plate. Thereby, since there is no need to dispose the polarization plate between the second substrate and the anisotropic scattering member, a distance between the second substrate and the anisotropic scattering member can be shorter or closer. Therefore, the light emitted from the second substrate can directly enter the anisotropic scattering member. Therefore, it is possible to prevent the light emitted from the second substrate from expanding in the display surface and thus reduce the blurring of images. It is also possible to set the scattering axis direction to the same direction as the main view angle direction. Thereby, the anisotropic scattering member can scatter the light entering the anisotropic scattering member toward the main view angle direction. Therefore, the anisotropic scattering member can reduce the light emitting toward a predetermined direction without scattering, and thus reduce the directional dependency of light emitting from the anisotropic scattering member. Thereby, the blurring of images can be reduced and thus the directional dependency of light can be reduced. Therefore, the visibility can be improved.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

BRIEF DESCRIPTION OF THE FIGURES

FIG. 1 is a partially cutout perspective view illustrating a general configuration of a transflective LCD device to which the present disclosure is applied;

FIG. 2A is a circuit diagram illustrating a fundamental pixel circuit;

FIG. 2B is a schematic view illustrating pixels in color display;

FIG. 2C is a schematic view illustrating pixels in monochrome display;

DETAILED DESCRIPTION

Figure 3:
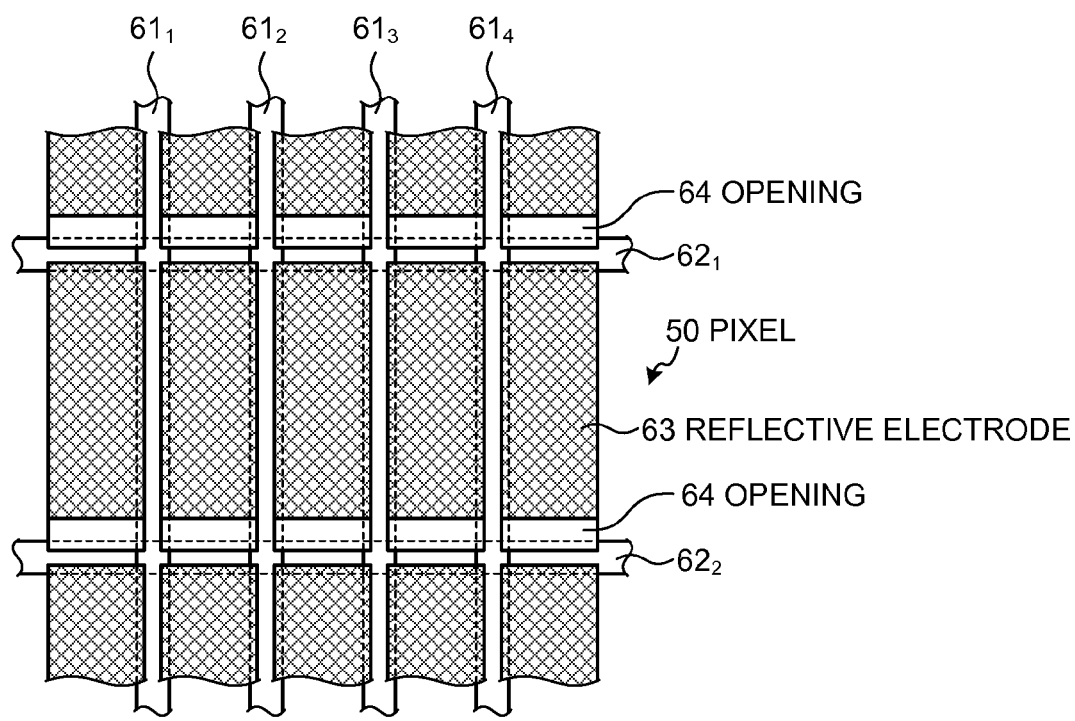
FIG. 3 is a plan view illustrating a pixel portion of the transflective LCD device.

The present disclosure will now be described according to the following orders and with reference to the accompanying drawings.

1. Transflective LCD Device
1-1. Transflective LCD device for Color Display
1-2. Fundamental Pixel Circuit
1-3. Pixel and Sub-pixel
1-4. Electrode Structure of Pixel portion
1-5. Driving Scheme of LCD Panel
1-6. Anisotropic Scattering Member
1-7. Backlight Unit
2. Electronic apparatuses
3. Configuration of Present Disclosure
<1. Transflective LCD Device>

A technology in the present disclosure can be applied to a flat panel type display device. Examples of the flat panel type display device include a display device using a liquid crystal display (LCD) panel, a display device using electro luminescence (EL) display panel, a display panel using a plasma display (PD) panel, and so on.

These flat panel type display devices can be classified into transmissive type and reflective type, according to display schemes. The technology in the present disclosure can be applied to a reflective display device and also applied to a transflective liquid crystal display device having a feature of transmissive type display and a feature of reflective type display. Namely, it is sufficient for the technology in the present disclosure to employ a structure for displaying an image by using a light reflection from a reflective electrode. The following explanation is focused on a transflective liquid crystal display which has a viewable screen or monitor both in a bright environment or in a dark environment and which can reduce the power consumption. The reflective liquid crystal display device and the transflective liquid crystal display device having the aforementioned features are preferably used as a display unit of electronic apparatus, especially portable electronic apparatus likely to be used in on-the-go situation, i.e. mobile computing device including mobile information device such as digital camera or mobile communication device such as mobile phone. Herein, the reflective or transflective type liquid crystal display device may be also called "reflective or transflective liquid crystal display device" or "reflective or transflective LCD display" for the simplicity.

The transflective liquid crystal display device applied to the present disclosure may be a display device for displaying a monochrome image or may be a display device for displaying a color image. In the case of the color display, one pixel (unit pixel) which is a unit for composing a color image includes a plurality of sub-pixels. Specifically, in the display device for displaying a color image, the unit pixel may include three sub-pixels, for example, a sub-pixel displaying red (Red: R), a sub-pixel displaying green (Green: G), and a sub-pixel displaying blue (Blue: B).

However, one pixel is not limited to a combination of RGB three primary colors. For example, it is possible to form a unit pixel by adding one or more sub-pixels of one or more colors to the RGB three primary color sub-pixels. Specifically, for example, it is possible to form a unit pixel by adding at least one sub-pixel displaying white (White: W) in order to improve brightness or luminance.

[1-1. Transflective LCD Device for Displaying Color Image]

A transflective liquid crystal display device capable of displaying a color image is explained as an example of a transflective liquid crystal display device to which the present disclosure is applied, with reference to drawings.

FIG. 1 is a partially cutout perspective view illustrating a general configuration of a transflective LCD device capable of displaying a color image, to which the present disclosure is applied.

As illustrated in FIG. 1, the transflective liquid crystal display device 1 applied to the present disclosure includes a first panel unit (TFT substrate) 10, a second panel unit (CF substrate) 20, and a liquid crystal layer 30, as primary components. In the transflective liquid crystal display device 1, a surface of the second panel unit 20 is a display surface side. The first panel unit 10 and the second panel unit 20 are oppositely disposed with a predetermined gap. The liquid crystal layer 30 is formed by filling the gap between the first panel unit 10 and the second panel unit 20 with a liquid crystal material and then sealing the gap filled with the liquid crystal material.

The first panel unit 10 includes a polarization plate 11, a half wave plate 12, a quarter wave plate 13, a first substrate 14 made of transparent material such as glass, and a planarization film 15 in this order from an opposite side of the liquid crystal layer 30, that is, from the backlight unit 40 side.

In the first panel unit 10, a plurality of signal lines and a plurality of scanning lines are formed on the first substrate 14 such that these signal lines and scanning lines cross each other. A sub-pixel 50 is disposed at each crossing position of the signal lines and the scanning lines. These sub-pixels 50 are two-dimensionally arrayed in a matrix. Hereinafter, these sub-pixels 50 may be also called "pixels 50" for simplicity.

On the first substrate 14, circuit element including a capacitative element and a switching element such as TFT (Thin Film Transistor) and the like is formed at each pixel 50. A planarization film is formed on these circuit elements, signal lines and scanning lines so that a surface of the first panel unit 10 is planarized. On the planarization film, the reflective electrode is formed for each pixel 50. The reflective electrode will be described later. The first substrate 14 may be also called TFT substrate, since the circuit elements including TFT are formed on the first substrate 14.

The plurality of signal lines are wiring for transmitting signals (display signal/video signal) to drive pixels 50. The signal lines have a wiring structure extending along each row of pixels 50 in the matrix array, i.e. a row direction (Y-axis direction in FIG. 1). The plurality of scanning lines are wiring for transmitting signals (scanning signal) to select a line of pixels 50. The scanning lines have a wiring structure extending along each line of pixels 50, i.e. a line direction (X-axis direction in FIG. 1). The X-axis direction and the Y-axis direction orthogonally cross each other.

The second panel unit 20 includes a transparent electrode 21 made of ITO (Indium Tin Oxide) or the like, a color filter 22, a second substrate 23 made of a transparent material such as glass, a quarter wave plate 24, a half wave plate 25, and a polarization plate 26 in this order from the liquid crystal layer 30. In the second panel unit 20, an anisotropic scattering member 27 is disposed between the second substrate 23 and the quarter wave plate 24.

In the second panel unit 20, the color filter 22 has a structure in which stripe-shaped RGB filters extending in the row direction (Y-axis direction) are repeatedly arranged with a pitch or interval the same as a pitch or interval of the pixels 50 in the line direction (X-axis direction). The second substrate 23 may be also called CF (Color Filter) substrate, since the second substrate 23 includes the color filer 22.

The transflective liquid crystal display panel is formed of the first panel unit 10, the second panel unit 20 oppositely disposed to the first panel unit 10, and the liquid crystal layer 30 disposed between the first panel unit 10 and the second panel unit 20. In the liquid crystal display panel, the upper surface of the second panel unit 20 is a display surface.

The backlight unit 40 is an illuminating unit that illuminates the LCD panel from the back side of the LCD panel, that is, from the side opposite to the liquid crystal layer 30 of the first panel unit 10. The backlight unit 40 may be formed of a light source such as a light-emitting diode (LED) and a fluorescent tube, and well-known members such as a prism sheet, a diffusion sheet, and a light guiding plate. The configuration and the components of the backlight unit 40 are not particularly restricted. The backlight unit 40 provided to the transflective LCD device 1 according to the present disclosure is what is called an edge-light type backlight unit, which will be described later in detail.

In the reflective liquid crystal display device 1 having the aforementioned structure, each pixel 50 has a reflective display area (reflective display portion) and a transmissive display area (transmissive display portion). As described above, the reflective display area includes the reflective electrode formed at each pixel 50 on the surface of the planarization film of the first substrate 14, so that a light entered from outside through the second panel unit 20 is reflected from the reflective electrode and the reflected light is used for displaying an image. The transmissive display area provided at each pixel 50 will be described later in detail.

[1-2. Fundamental Pixel Circuit]

Now, a fundamental pixel circuit of the pixel 50 is be described with reference to FIG. 2A. The X-axis direction in FIG. 2A corresponds to a line direction of the transflective liquid crystal display device 1 as illustrated in FIG. 1, and the Y-axis direction in FIG. 2A corresponds to a row direction of the reflective liquid crystal display device 1 as illustrated in FIG. 1.

As illustrated in FIG. 2A, the plurality of signal lines 61 ($61_1$, $61_2$, $61_3$, . . . ) and the plurality of scanning lines 62 ($62_1$, $62_2$, $62_3$, . . . ) are arranged so that these lines cross each other, and a pixel 50 is disposed at each cross position of these lines. A direction along which the scanning lines 62 ($62_1$, $62_2$, $62_3$, ...) extend is a line direction (X-axis direction), and a direction along which the signal lines 61 ($61_1$, $61_2$, $61_3$, ...) extend is a row direction (Y-axis direction). As described before, the signal lines 61 and the scanning lines 62 are formed on a surface of the first substrate (TFT substrate) 14 of the first panel unit 10. One end of each signal line 61 is connected to an output terminal of a signal output circuit 70, the output terminal provided in conformity with each row. One end of each scanning line 62 is connected to an output terminal of a scanning circuit 80, the output terminal provided in conformity with each line.

Each pixel 50 may have a structure in which a pixel transistor 51 using TFT, a liquid crystal capacity 52, and a holding capacity 53 are included. A gate electrode of the pixel transistor 51 is connected to the scanning line 62 ($62_1$, $62_2$, $62_3$, ...) and a source electrode of the pixel transistor 51 is connected to the signal line 61 ($61_1$, $61_2$, $61_3$, ...).

The liquid crystal capacity 52 represents a capacitive component of the liquid crystal material generated between a pixel electrode and an opposite electrode (corresponding to the transparent electrode 21 in FIG. 1) oppositely disposed to the pixel electrode. In that case, the pixel electrode is connected to a drain electrode of the pixel transistor 51. The pixel electrode corresponds to the reflective electrode formed for each sub-pixel in color display, and corresponds to the reflective electrode formed for each pixel in monochrome display. A common electric potential Vcom which is a DC voltage is applied to the opposite electrode of the liquid crystal capacity 52. The Vcom is applied to all the pixels commonly. One electrode of the holding capacity 53 is connected to the pixel electrode of the liquid crystal capacity 52 and the other electrode of the holding capacity 53 is connected to the opposite electrode of the liquid crystal capacity 52.

As apparently understood from the aforementioned pixel circuit, the plurality of signal lines 61 ($61_1$, $61_2$, $61_3$, ...) are wiring for transmitting signals to drive pixels 50, that is, wiring for transmitting video signals output from the signal output circuit 70 to pixels 50 for each pixel row. Furthermore, the plurality of scanning lines 62 ($62_1$, $62_2$, $62_3$, ...) are wiring for transmitting signals to select a line of pixels 50, that is, wiring for transmitting scanning signals output from the scanning circuit 80 to each pixel line.

[1-3. Pixel and Sub-Pixel]

In a case where the transflective liquid crystal display device 1 is capable of displaying a color image, one pixel (i.e. a unit pixel 5) which is a unit for forming a color image may include a plurality of sub-pixels 50 as illustrated in FIG. 2B. In this example, the unit pixel 5 includes a sub-pixel 50R for displaying R, a sub-pixel 50B for displaying B, and a sub-pixel 50G for displaying G. The sub-pixels 50R, 50B, and 50G included in the unit pixel 5 are aligned in X-axis direction that is a line direction of the transflective liquid crystal display device 1. As described above, the unit pixel 5 may include one or more sub-pixels of one or more colors. In a case where the transflective liquid crystal display device 1 is capable of displaying a monochrome image only, one pixel (i.e. a unit pixel 5M) which is a unit for forming a monochrome image is a pixel 50 (corresponding to the sub-pixel 50 in the color image), as illustrated in FIG. 2C. The unit pixel 5 is a basic unit for displaying a color image, and a unit pixel 5M is a basic unit for displaying a monochrome image.

[1-4. Electrode Structure of Pixel Portion]

Now, an electrode structure of the pixel 50 is described prior to the explanation of the transmissive display area.

FIG. 3 is for illustrating an electrode structure of the pixel portion. FIG. 3 is a plan view illustrating a pixel portion of a transflective liquid crystal display device. In FIG. 3, the reflective electrode 63 is depicted with hatching.

As illustrated in FIG. 3, in the pixel portion of the transflective liquid crystal display device 1, the pixels 50 are arrayed in a matrix. The signal lines 61 extend along a row direction in spaces between the adjacent pixels 50. The scanning lines 62 extend along a line direction in spaces between adjacent pixels 50. As described above, the signal lines 61 and the scanning lines 62 are disposed or arranged so that they cross each other on the first substrate 14 of the first panel unit 10 in FIG. 1.

In the pixel unit (pixel array portion) having such a structure, the transflective LCD device 1 illustrated in FIG. 3 has the reflective electrode 63 made of a metal, such as aluminum, and an opening 64 in one pixel 50. The transflective LCD device 1 uses the opening 64 as the transmissive display area. Since the opening 64 is formed in the pixel 50 to secure the transmissive display area, the opening 64 reduces the reflective electrode 63, that is, the reflective display area. This makes the reflective display performance of the transflective LCD device 1 lower than that of a reflective LCD device. In other words, securement of the transmissive display area and maintenance of the reflective display performance are in a trade-off relation. In the present embodiment, the opening 64 is formed in the pixel 50 side by the reflective electrode 63. Alternatively, the signal lines 61 and the scanning lines 62 may be disposed at positions other than the gaps between the adjacent reflective electrodes 63. In other words, the signal lines 61 and the scanning lines 62 may be disposed at a rear side of the reflective electrodes 63, so that the gaps between the adjacent reflective electrodes 63 serve as openings.

[1-5. Driving Scheme of LCD Panel]

In LCD panels or LCD devices, in order to prevent a deterioration of a specific resistance (a resistance value specific to a material) of liquid crystal by the continuous application of direct voltage of a same polarity, the polarity of video signal is inverted with a predetermined period on the basis of the common electric potential Vcom.

As such a driving scheme of LCD panel, there are known various schemes including line inversion, dot inversion, frame inversion and the like. The line inversion is a driving scheme in which a polarity of a video signal is inverted with 1H period (H means a horizontal period) which corresponds to one line (one pixel line). The dot inversion is a driving scheme in which a polarity of a video signal is alternately inverted for every pixel adjacent each other in up and down direction, and left to right direction. The frame inversion is a driving scheme in which a polarity of video signals to be given to all the pixels in one frame which corresponds to one screen is inverted together.

When the frame inversion is employed for the transflective LCD device 1, the signal voltage of the same polarity is given to the signal line during one frame period. As a result, shading may occur. Therefore, when the frame inversion is employed in the transflective LCD device 1, a pixel having a memory function is employed as the pixel 50. Specifically, so-called "MIP (Memory in Pixel)" technology is employed. The MIP technology is that each pixel is provided with a memory capable of storing data therein. In the case of the MIP technology, a constant voltage is always applied to the pixels 50. Thereby, the shading can be reduced.

In the MIP technology, owing to pixels each having a memory to store data therein, an analog display mode and a memory display mode can be realized. The analog display mode is a display mode to analogically display a gradation of pixels. The memory display mode is a display mode to digitally display a gradation of pixels on the basis of binary information (logical "1"/logical "0") stored in memories in pixels.

In the memory display mode, since information stored in memories is used, there is no need to perform a writing operation of signal voltage reflecting a gradation in each frame period. Therefore, in comparison with the analog display mode involving a writing operation of signal voltages reflecting a gradation in each frame period, the power consumption can be reduced by employing the memory display mode. In other words, the power consumption of the reflective LCD apparatus 1 can be reduced.

Figure 4:
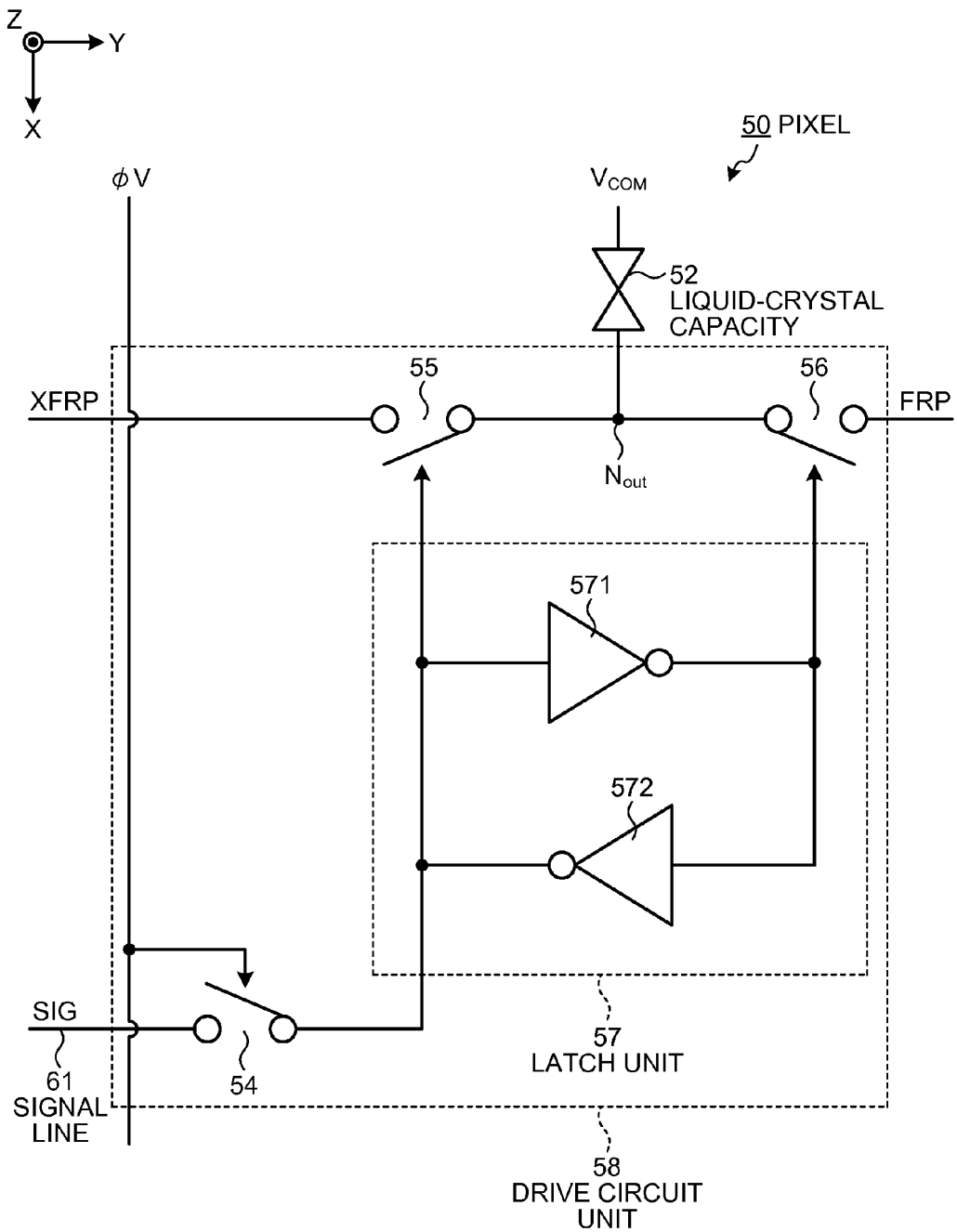
FIG. 4 is a block diagram illustrating an exemplary circuit configuration of a pixel employing the MIP technology.
Figure 5:
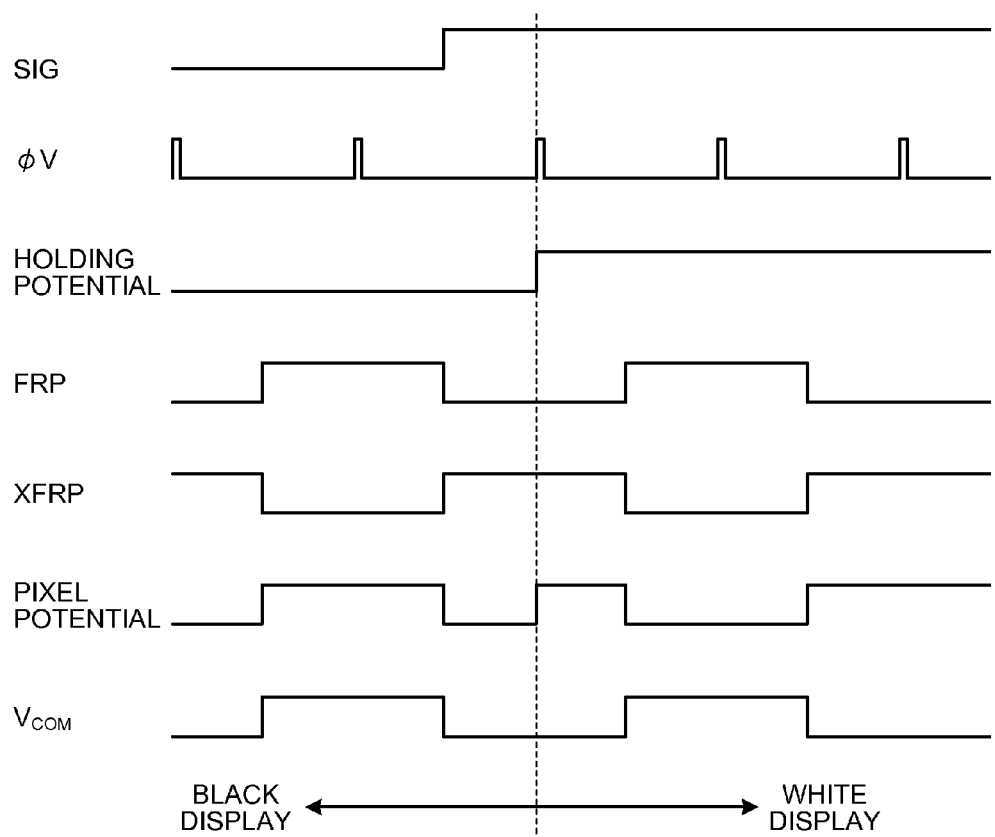
FIG. 5 is a timing chart for explaining an operation of the pixel employing the MIP technology.

FIG. 4 is a block diagram illustrating an example of a circuit configuration of a pixel employing the MIP technology. In FIG. 4, components or elements corresponding to components or elements in FIG. 2A carry the same reference numerals. FIG. 5 is a timing chart illustrating an operation of pixel employing the MIP technology.

As illustrated in FIG. 4, the pixel 50 includes a drive circuit 58 having three switching elements 54, 55, 56 and a latch unit 57, in addition to the liquid crystal capacity (liquid crystal cell) 52. The drive circuit 58 is provided with a SRAM (Static Random Access Memory) function. The pixel 50 provided with the drive circuit 58 has a pixel structure having the SRAM function. The liquid crystal capacity (liquid crystal cell) 52 represents the liquid crystal capacity generated between the pixel electrode (e.g. the reflective electrode 63 in FIG. 3) and the opposite electrode oppositely disposed thereto.

One end of the switching element 54 is connected to a signal line 61 (corresponding to signal lines $61_1$ to $61_3$ in FIG. 2A). The switching element 54 is turned on (closed state) when a scanning signal $\phi V$ from the scanning circuit 80 (FIG. 2A) is given to the element 54. In that state, data SIG supplied from the signal output circuit 70 (FIG. 2A) through a signal line 61 is taken into the drive circuit 58. The latch unit 57, which includes a pair of inverters 571, 572 reversely arranged each other in parallel, latches an electric potential corresponding to the data SIG taken through the switching element 54.

A control pulse XFRP having an inverted phase of the common electric potential Vcom is applied to one end of the switching element 55. A control pulse FRP having a same phase of the common electric potential Vcom is applied to one end of the switching element 56. Other end of the switching element 55 and other end of the switching element 56 are commonly connected so that a common connection node thereof becomes an output node Nout of this pixel circuit. Either the switching element 55 or the switching element 56 is turned on depending on the polarity of the holding electric potential of the latch unit 57. Thereby, the control pulse FRP or XFRP is applied to a pixel electrode (e.g. the reflective electrode 63 in FIG. 3) of the liquid crystal capacity 52 having an opposite electrode (e.g. the transparent electrode 21 in FIG. 1) to which the common electric potential Vcom is applied.

As clearly understood from FIG. 5, in this example, if the holding electric potential of the latch unit 57 has a negative polarity, the pixel electric potential of the liquid crystal capacity 52 has the same phase as the common electric potential Vcom. Thereby, black is displayed. If the holding electric potential of the latch unit 57 has a positive polarity, the pixel electric potential of the liquid crystal capacity 52 has the inverted phase of the common electric potential Vcom. Thereby, white is displayed.

Apparently from the aforementioned explanation, in the pixel 50 of the MIP technology, either the switching element 55 or the switching element 56 is turned on depending on the polarity of the holding electric potential of the latch unit 57, so that the control pulse FRP or XFRP is applied to the pixel electrode (e.g. the reflective electrode 63 in FIG. 3) of the liquid crystal capacity 52. As a result, a constant voltage is always applied to the pixel 50. Thereby, the shading can be prevented.

In this example, an explanation is made on a case where the SRAM is used as a memory built in the pixel 50. However, this is not exclusive, and other memory such as DRAM (Dynamic Random Access Memory) may be employed.

In the present embodiment, when the MIP technology is employed, an area coverage modulation method, a time division modulation method, and the like may be used. In the time division modulation method, the pixel electric potential varies with time even in a static image, and liquid crystal molecules move in the pixel and among the pixels. Therefore, the area coverage modulation method may be preferably used rather than the time division modulation method. In the area coverage modulation method, gaps among the electrodes increase because the pixel electrode, which is the reflective electrode 63, is divided. Accordingly, it is advantageous that the transmittance of the panel is higher than in a case where the pixel electrode is not divided.

In the above example, the pixel using the MIP technology in which each pixel has a memory capable of storing the data therein is used as the pixel having the memory function, but the embodiment is not limited thereto. Examples of the pixel having the memory function include the pixel using well-known memory-type liquid crystal in addition to the pixel using the MIP technology.

The display mode of the liquid crystal includes a normally white mode in which white is displayed when an electric field (voltage) is not applied and black is displayed when the electric field is applied, and a normally black mode in which black is displayed when the electric field is not applied and white is displayed when the electric field is applied. In both modes, the liquid crystal cell has the same structure, and has different arrangements of the polarization plates 11 and 26 in FIG. 1. The transflective liquid crystal display device 1 according to the embodiment is driven in the normally black mode in which black is displayed when the electric field (voltage) is not applied and white is displayed when the electric field is applied.

[1-6. Anisotropic Scattering Member]

Figure 6:
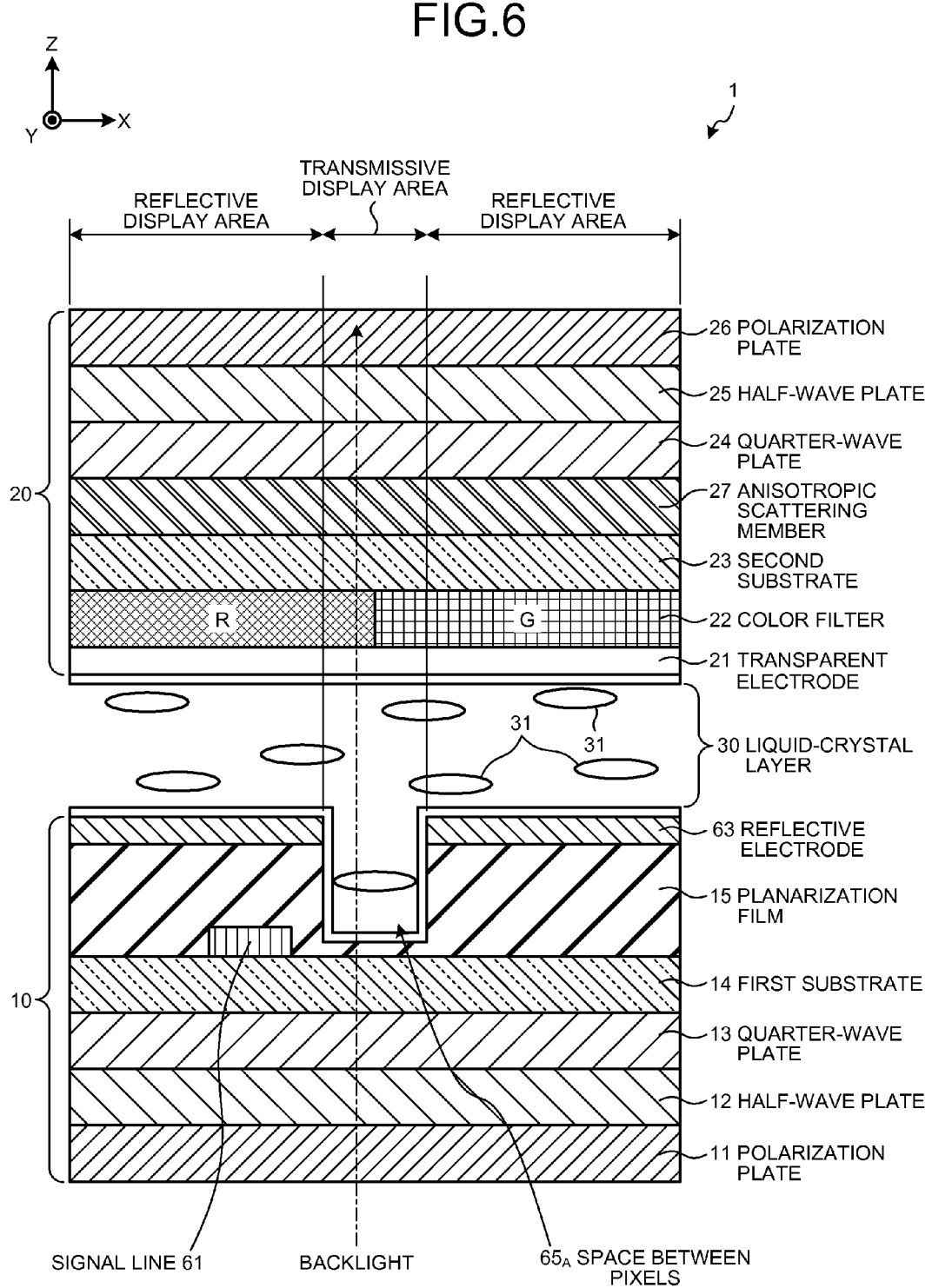
FIG. 6 is a sectional view illustrating a sectional structure of two pixels adjacent to each other in the row direction of the transflective LCD device.
Figure 7A:
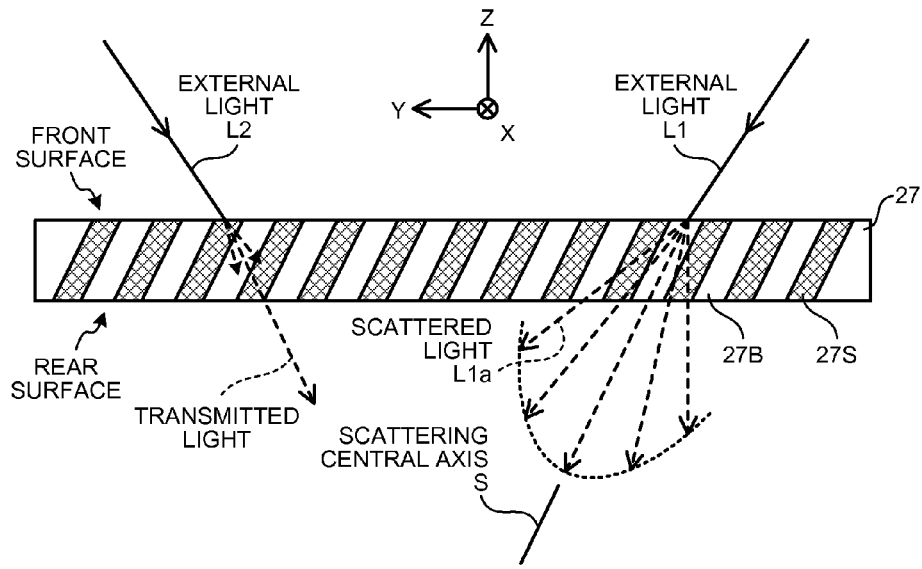
FIG. 7A is a sectional view illustrating an anisotropic scattering member in which external light enters from the front surface.
Figure 7B:
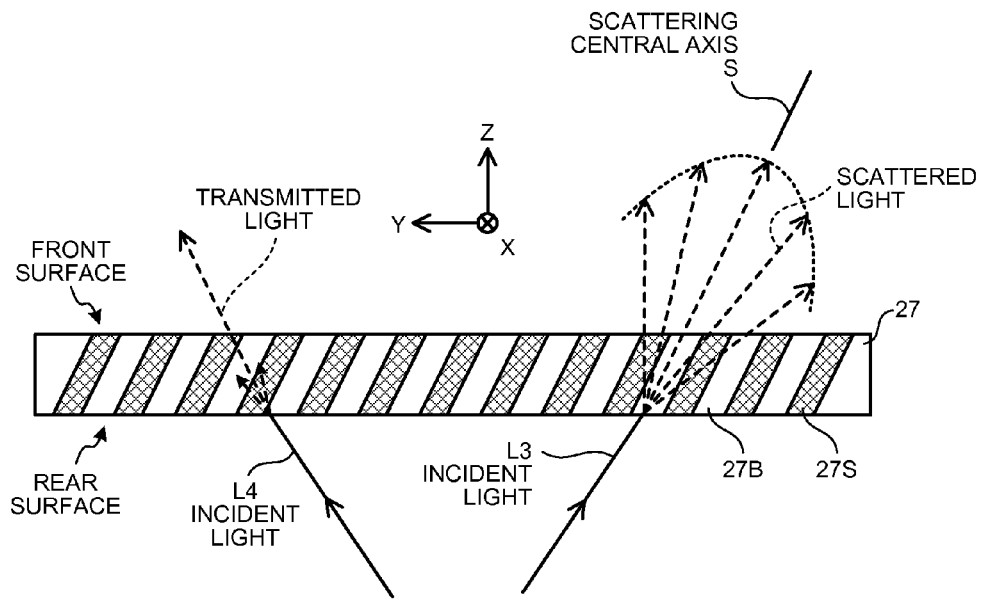
FIG. 7B is a sectional view illustrating the anisotropic scattering member in which incident light enters from the rear surface.
Figure 8:
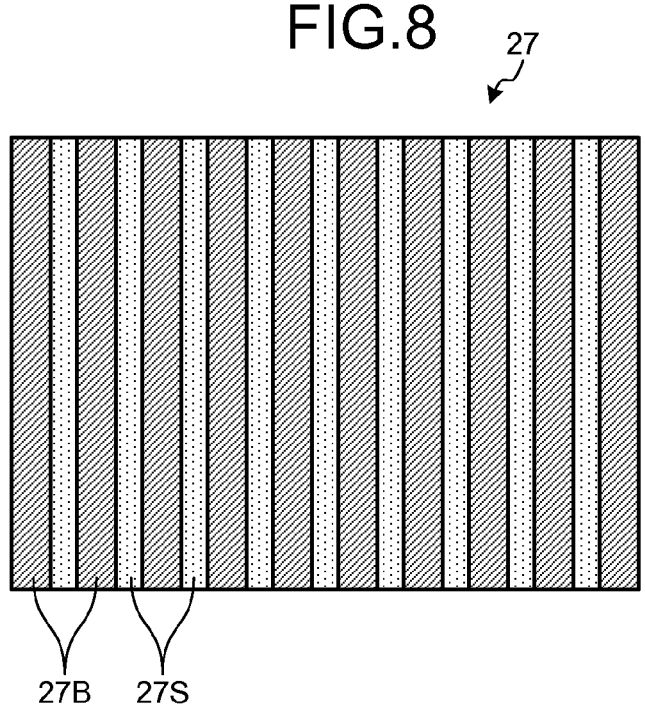
FIG. 8 is a plan view illustrating an example of the anisotropic scattering member.
Figure 9:
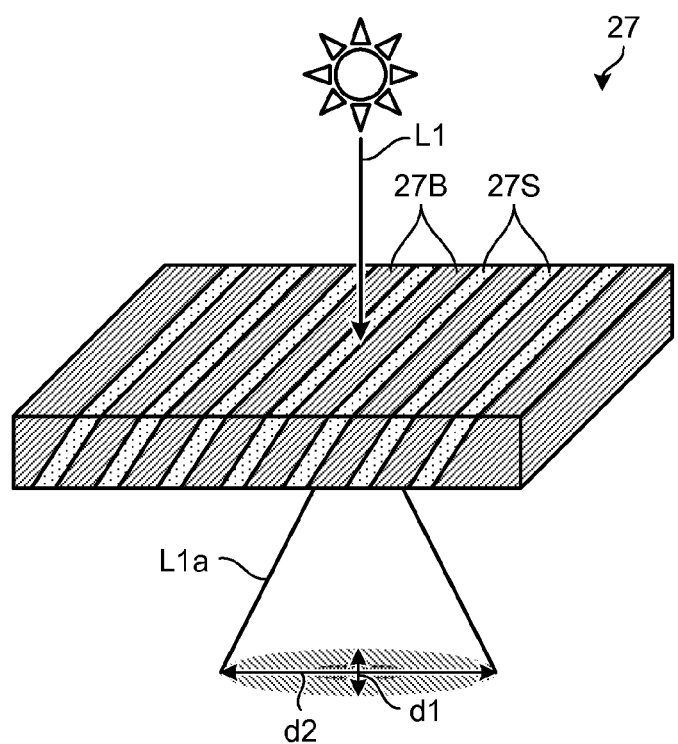
FIG. 9 is a schematic view for explaining a function of the anisotropic scattering member.
Figure 10:
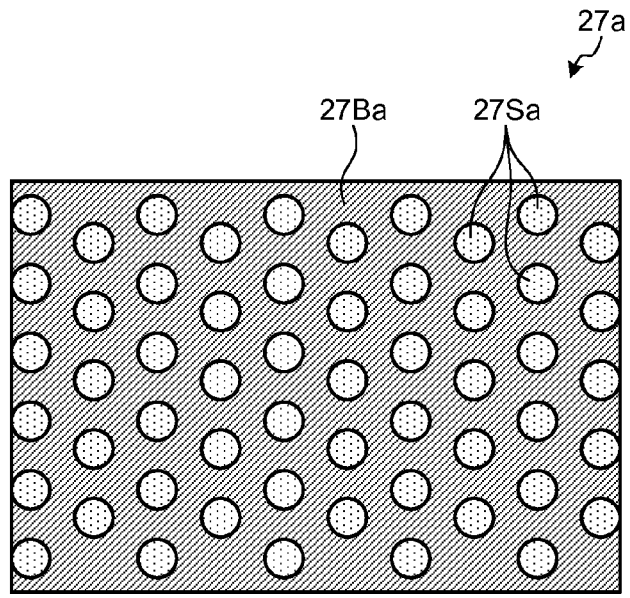
FIG. 10 is a plan view illustrating another example of the anisotropic scattering member.
Figure 11:
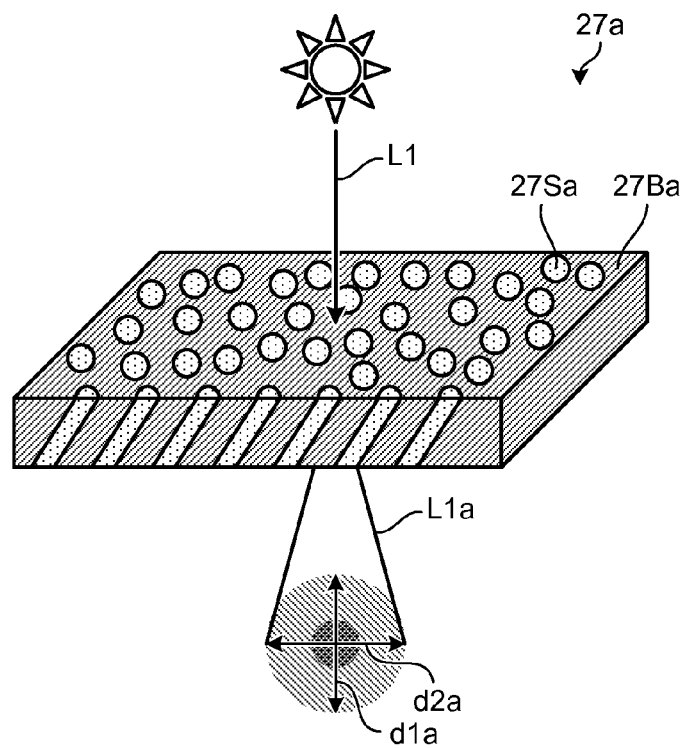
FIG. 11 is a schematic view for explaining a function of the anisotropic scattering member.

FIG. 6 is a sectional view illustrating a sectional structure of two pixels adjacent to each other in the row direction (X-direction) of the transflective LCD device. In FIG. 6, components corresponding to those in FIG. 1 are denoted by the same reference numerals. FIG. 7A is a sectional view illustrating an anisotropic scattering member in which external light enters from the front surface. FIG. 7B is a sectional view illustrating the anisotropic scattering member in which incident light enters from the rear surface. FIG. 8 is a plan view illustrating an example of the anisotropic scattering member. FIG. 9 is a schematic view for explaining a function of the anisotropic scattering member. FIG. 10 is a plan view illustrating another example of the anisotropic scattering member. FIG. 11 is a schematic view for explaining a function of the anisotropic scattering member.

As illustrated in FIG. 6, the transflective LCD device 1 includes a sheet-like anisotropic scattering member 27 that scatters light. The anisotropic scattering member 27 is disposed on the downstream of the liquid crystal layer 30 containing liquid crystal molecules 31 in a traveling direction of light reflected from the reflective electrode 63. More specifically, the transflective LCD device 1 is provided with the anisotropic scattering member 27 between the second substrate 23 and the quarter wave plate 24. The anisotropic scattering member 27 is an anisotropic or isotropic layer that scatters light reflected from the reflective electrode 63 and backlight passing through a space $65_A$ between the pixels. A light control film (LCF) may be used as the anisotropic scattering member 27, for example.

The anisotropic scattering member 27 is a forward scattering layer that scatters light forward largely and backward small. The anisotropic scattering member 27 is an anisotropic scattering layer that scatters light entered from a specific direction (a scattering axis direction). When light (e.g. external light) enters the anisotropic scattering member 27 from a predetermined direction of the polarization plate 26 side relative to the second substrate 23, the anisotropic scattering member 27 transmits the entered light almost without scattering but considerably scatters the light (returned light, reflected light) reflected and returned from the reflective electrode 63.

As illustrated in FIG. 7A and FIG. 7B, the anisotropic scattering member 27 includes a first region 27B and a second region 27S. The two types of regions 27B and 27S have different refractive indexes. The anisotropic scattering member 27 may have a louver-like structure in which a plurality of plate-like second regions 27S are disposed at predetermined intervals in the first region 27B as illustrated in FIG. 8 and FIG. 9. Alternatively, an anisotropic scattering member 27a may have a column-like structure in which column-like second regions 27Sa are disposed in a first region 27Ba as illustrated in FIG. 10 and FIG. 11. In the present embodiment, the first region 27B is made of a material having a refractive index lower than that of the second region 27S. In other words, the first region 27B is made of a material having a relatively low refractive index and serves as a low refractive index region in the anisotropic scattering member 27. The second region 27S is made of a material having a relatively high refractive index and serves as a high refractive index region in the anisotropic scattering member 27.

The anisotropic scattering member 27 is arranged or disposed so that light enters from a surface where the refractive index difference in a boundary or vicinity thereof between the first region (low refractive index region) 27B and the second region (high refractive index region) 27S is relatively large and the light exits as scattered light from a surface the refractive index difference in a boundary or vicinity thereof between the first region 27B and the second region 27S is relatively small.

In the anisotropic scattering member 27, the first region 27B and the second region 27S extend in the thickness direction and are inclined in a predetermined direction, for example. The anisotropic scattering member 27 is formed by irradiating a resin sheet that is a mixture of two or more types of photopolymerizable monomers or oligomers having different refractive indexes with ultraviolet rays from an oblique direction, for example. The anisotropic scattering member 27 may have another structure different from the structure described above and may be manufactured by another method different from the method described above. The anisotropic scattering member 27 may be formed of one layer or a plurality of layers. In the case where the anisotropic scattering member 27 is formed of a plurality of layers, the layers may have the same structure or structures different from one another.

As illustrated in FIG. 7A, the anisotropic scattering member 27 scatters the external light L1 when the external light L1 enters from a predetermined direction (the scattering axis direction) relative to the second substrate 23, for example. The anisotropic scattering member 27 transmits the external light L2 when the external light L2 enters from a predetermined direction (a direction other than the scattering axis direction). The anisotropic scattering member 27 transmits the external light L2 when the external light L2 enters from the second predetermined direction and then scatters light reflected by the reflective electrode 63 among the transmitted light in a predetermined range centered about a scattering center (scattering central axis) S. The external light L1 and L2 is parallel light entering the polarization plate 26 of the second panel unit 20. The external light L1 and L2 may be non-polarized light or may be polarized light. Similarly, as illustrated in FIG. 7B, for example, when the incident light L3 and L4 enter from the opposite directions from the external light L1 and L2, the anisotropic scattering member 27 scatters the light entered from a predetermined direction (the scattering axis direction) relative to the second substrate 23, and transmits the light entered from a predetermined direction (a direction other than the scattering axis direction). Specifically, the anisotropic scattering member 27 scatters the incident light L3 when the incident light L3 enters from the predetermined direction relative to the second substrate 23. The anisotropic scattering member 27 transmits the incident light L4 when the incident light L4 enters from the predetermined direction. The predetermined directions of L1 and L3 are the same direction except that they are reversed by 180 degrees from each other. The predetermined directions of L2 and L4 are the same direction except that they are reversed by 180 degrees from each other. The light may be scattered at any time while the light passes through the scattering member 27. For example, the light may be scattered when the light enters the scattering member 27 or may be scattered when the light exits the scattering member 27 or may be scattered while the light travels inside the scattering member 27.

When the anisotropic scattering member 27 has the louver-like structure as illustrated in FIG. 8, the scattered light L1a scattered from the external light L1 through the anisotropic scattering member 27 has an elliptical form having a shorter diameter d1 and a longer diameter d2, as illustrated in FIG. 9. The shorter diameter d1 corresponds to a longitudinal direction of the first and second regions 27B, 27S. The longer diameter d2 corresponds to a shorter side direction of the first and second regions 27B, 27S, i.e. an alignment direction of the first and second regions 27B, 27S. In a case where the returned light reflected from the reflective electrode 63 is scattered, the scattered light also has an elliptical form. When the anisotropic scattering member 27a has the column-like structure as illustrated in FIG. 10, the scattered light L1a scattered from the external light L1 through the anisotropic scattering member 27a has a circular form as illustrated in FIG. 11. In the circular form, a diameter d1a and a diameter d2a are the same length. When the anisotropic scattering member 27a scatters the returned light reflected from the reflective electrode 63, the scattered light also has a circular form.

Figure 12:
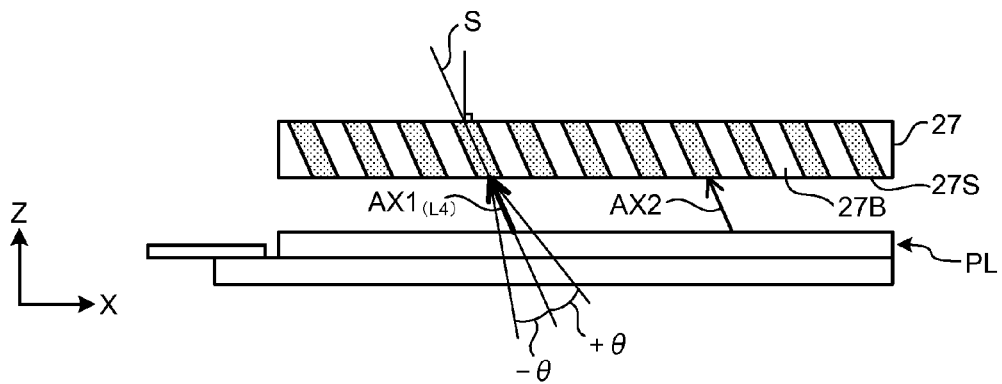
FIG. 12 is a schematic view illustrating a relationship between a scattering axis direction of the anisotropic scattering member and a main view angle direction of a liquid crystal panel.

FIG. 12 is a schematic view illustrating a relationship between the scattering axis direction of the anisotropic scattering member and a main view angle direction of the liquid crystal panel. As illustrated in FIG. 12, a liquid crystal panel PL corresponds to a portion from the first panel unit 10 to the second substrate 23 of the second panel unit 20 via the liquid crystal layer 30. In FIG. 12, the anisotropic scattering member 27 and the liquid crystal panel PL are illustrated in such a manner that they are separated from each other, for better understanding of the relationship between a scattering axis direction AX1 of the anisotropic scattering member 27 and a main view angle direction AX2 of the liquid crystal panel PL.

The scattering center (scattering central axis) S of the anisotropic scattering member 27 is inclined relative to the normal line direction of the surface on the display side of the anisotropic scattering member 27. Herein, the scattering center S is an axis about which the anisotropic scattering property of the incident light is substantially symmetric. In other words, the scattering center is an axis extending in a direction along which the incident light is scattered at maximum. In the liquid crystal panel PL, the main view angle AX2 is set as a predetermined direction which intersects the display surface (i.e. an interface between the liquid crystal panel PL and the anisotropic scattering member 27) of the liquid crystal panel PL. The main view angle AX2 is inclined relative to the display surface of the liquid crystal panel PL. The main view angle corresponds to a direction from which the user of the transflective liquid crystal display device 1 views a video display screen (image display surface) of the device 1 when using the device 1. In a case where the video display screen has a rectangular shape, the main view angle corresponds to a direction orthogonal to an edge or side of the rectangular video display screen nearest to the user.

When the incident light L4 entering the anisotropic scattering member 27 from the liquid crystal panel PL is scattered by passing though the anisotropic scattering member 27, the incident direction of the incident light L4 coincides with the scattering axis direction AX1. In other words, the incident light L4 entering the anisotropic scattering member 27 along the scattering axis direction AX1 is scattered by passing through the anisotropic scattering member 27. In this case, the scattering axis direction AX1 is configured the direction in which the scattering center S extends and a direction inclined relative to the scattering center S by a predetermined angle. In other words, the scattering axis direction AX1 is a direction having a predetermined angle range centered around the scattering center S. The predetermined angle range is an angle range within plus or minus θ relative to the scattering center S. The angle θ is 20 degrees or less, for example. More preferably, the angle θ is 15 degrees. In this case, the scattering axis direction AX1 of the anisotropic scattering member 27 and the main view angle direction AX2 of the liquid crystal panel PL are inclined to the same side relative to the normal line direction of the display surface of the liquid crystal panel PL. Furthermore, the scattering axis direction AX1 of the anisotropic scattering member 27 coincides with the main view angle direction AX2 of the liquid crystal panel PL.

Thus, in the transflective LCD device 1, the anisotropic scattering member 27 can be provided between the second substrate 23 and the polarization plate 26. More specifically, the anisotropic scattering member 27 can be provided between the second substrate 23 and the quarter wave plate 24. Thereby, the second substrate 23 and the anisotropic scattering member 27 can be provided adjacent to each other without the polarization plate 26, the quarter wave plate 24, and the half wave plate 25 interposed therebetween. Since the second substrate 23 and the anisotropic scattering member 27 are in contact with each other, the light emitted from the second substrate 23 can directly enter the anisotropic scattering member 27. Thereby, the light emitted from the second substrate 23 hardly spread out or expand in the display surface of the transflective LCD device 1. Therefore, it is possible to reduce a blurred image or a blurring in an image displayed on the display surface. Furthermore, in the transflective LCD device 1, the scattering axis direction AX1 of the anisotropic scattering member 27 and the main view angle direction AX2 of the liquid crystal panel PL are the same direction. Thereby, the anisotropic scattering member 27 can scatter the light which is emitted from the second substrate 23 toward the main view angle direction AX2 and enters the anisotropic scattering member 27. Therefore, the anisotropic scattering member 27 can reduce the light emitting therefrom toward a predetermined direction without scattering. As a result, it is possible to reduce the directional dependency of the light emitting from the anisotropic scattering member 27. Thus, it is possible for the transflective liquid crystal display device 1 according to the present disclosure to reduce the blurring in images, and reduce the directional dependency of the light. Therefore, it is possible to improve the visibility.

[1-7. Backlight Unit]

Figure 13:
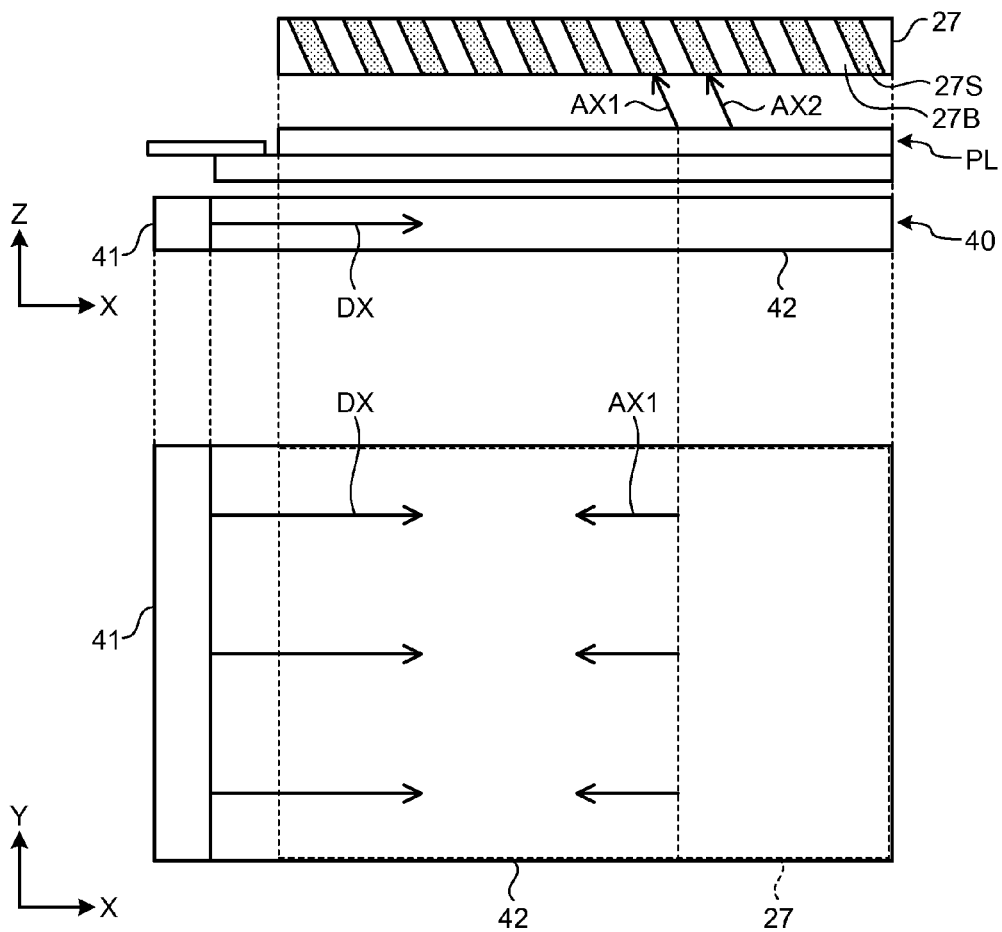
FIG. 13 is a schematic view illustrating a relationship among the scattering axis direction of the anisotropic scattering member, the main view angle direction of the liquid crystal panel, and a traveling direction of backlight in a light guiding plate.
Figure 14:
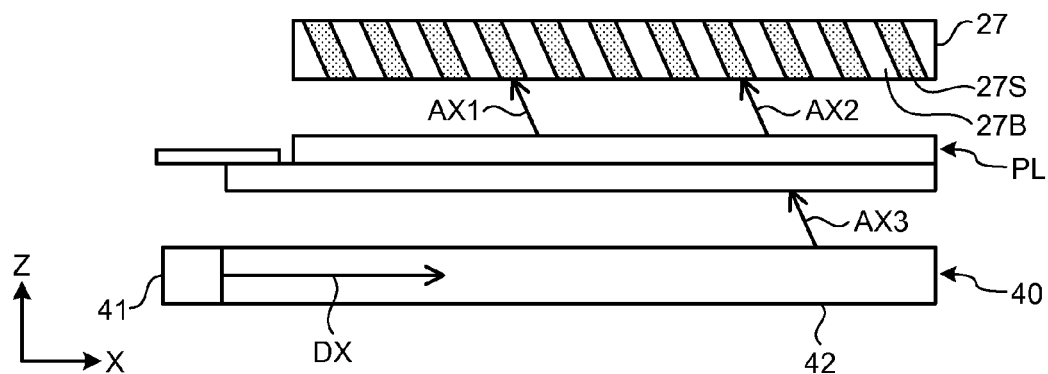
FIG. 14 is a schematic view illustrating a relationship among the scattering axis direction of the anisotropic scattering member, the main view angle direction of the liquid crystal panel, and an irradiation direction of backlight.

Now, the backlight unit 40 will be described, with reference to FIG. 13 and FIG. 14. FIG. 13 is a schematic view illustrating a relationship among the scattering axis direction of the anisotropic scattering member 27, the main view angle direction of the liquid crystal panel PL, and a traveling direction of backlight in a light guiding plate 42. FIG. 14 is a schematic view illustrating a relationship among the scattering axis direction of the anisotropic scattering member 27, the main view angle direction of the liquid crystal panel PL, and an irradiation direction (emitting direction) of backlight 40. An upper portion of FIG. 13 is a side view illustrating the backlight unit 40 when viewed from the Y-direction, whereas a lower portion of FIG. 13 is a plan view illustrating the backlight unit 40 when viewed from the Z-direction. In FIG. 13 and FIG. 14, the anisotropic scattering member 27, the liquid crystal panel PL, and the backlight unit 40 are illustrated in such a manner that they are separated from one another, for better understanding of the relationship among various directions.

As illustrated in FIG. 13, the backlight unit 40 is an edge-light type backlight unit and includes a light source unit 41 and a light guiding plate 42 that guides the light irradiated or emitted from the light source unit 41. The light source unit 41 irradiates or emits backlight toward the light guiding plate 42. As the light source unit 41, an LED, a fluorescent tube or the like may be used, for example. The light source unit is linearly disposed so as to extend in a predetermined direction. The extending direction of the light source unit 41 is a direction orthogonal to a traveling direction DX of the backlight irradiated or emitted toward the light guiding plate 42 and traveling in the light guiding plate 42.

The light guiding plate 42 is oppositely disposed (at a rear side) to the anisotropic scattering member 27 with an interposition of the liquid crystal panel PL therebetween so as to face the liquid crystal panel PL. The light guiding plate 42 is in a form of a square shaped plate and has a surface facing the liquid crystal panel PL (surface on the display side). The surface serves as a light emitting surface (light irradiation surface) for emitting or irradiating the backlight. A rear surface of the light guiding plate 42 serves as a light reflection surface. The light reflection surface reflects the backlight reaching the rear surface toward the light emitting surface. The light source unit 41 linearly extending is disposed along one side of the square shaped light guiding plate 42 so as to be adjacent to the light guiding plate 42. The side surface of the light guiding plate 42 adjacent to the light source unit 41 serves as a light incident surface from which the backlight from the light source unit 41 enters. Therefore, in the light guiding plate 42, the light incident surface and the light emitting surface are orthogonal to each other, while the light emitting surface and the light reflection surface are parallel to each other. The light guiding plate 42 guides the backlight from the light source unit 41 to X-direction which is orthogonal to the light source unit 41 extending in Y-direction and which is parallel to both the light emitting surface and the light reflection surface. In this case, the traveling direction DX of the backlight traveling in the light guiding plate 42 and the scattering axis direction AX1 are the same direction (X-direction) when viewed from Z-direction along which the first substrate 14 and the light guiding plate 42 face each other. In this case, the scattering axis direction AX1 is inclined toward the light source unit 41 of the backlight unit 40 relative to the normal line direction of the display surface. Therefore, the traveling direction DX of the backlight and the scattering axis direction AX1 are opposite when viewed from Z-direction. Besides, the light source unit 41 may be disposed at another end of the light guiding plate 42 in X-direction, or may be disposed at both ends of the light guiding plate 42 in X-direction.

Thus, the transflective LCD device 1 can align the traveling direction DX of the backlight traveling in the light guiding plate 42 with the scattering axis direction AX1 when viewed from the direction along which the first substrate 14 and the light guiding plate 42 face each other. Thereby, the backlight unit 40 can guide the backlight, which emits from the light emitting surface of the light guiding plate 42, toward a direction along the scattering axis direction AX1. Therefore, the reflective liquid crystal display device 1 can guide the backlight toward the scattering axis direction AX1, efficiently and effectively. As a result, it is possible to efficiently improve the luminance of the scattering backlight.

As illustrated in FIG. 14, the backlight unit 40 has a function to collect the backlight to be emitted toward the first panel unit 10 of the liquid crystal panel PL. In order to provide the backlight unit 40 with such a light collecting function, it can be realized by disposing a sheet-like optical deflecting member on the light emitting surface of the light guiding plate 42. The backlight unit 40 collects the backlight at a plurality of positions in the light emitting surface. Specifically, the backlight is collected at positions with a predetermined interval along the traveling direction of the backlight in the light guiding plate 42, at least. The backlight unit 40 inclines the irradiation direction (emitting direction) AX3 of the collected backlight relative to the normal line direction of the light emitting surface. In this case, the emitting direction AX3 of the backlight, the scattering axis direction AX1 of the anisotropic scattering member 27, and the main view angle direction AX2 of the liquid crystal panel PL are inclined toward the same side relative to the normal line direction of the light emitting surface (display surface). Furthermore, the emitting direction AX3 of the backlight, the scattering axis direction AX1, and the main view angle direction AX2 are the same direction.

As described above, in the transflective LCD device 1, the emitting direction AX3 of the backlight collected by the backlight unit 40 and the scattering axis direction AX1 of the anisotropic scattering member 27 can be inclined toward the same side relative to the normal line direction of the light emitting surface (display surface). Thereby, at least a part of the collected backlight is emitted toward a direction along the scattering axis direction AX1. Therefore, it is possible to improve the luminance due to the backlight on the display surface of the transflective LCD device 1. Furthermore, the transflective LCD device 1 can make the emitting direction AX3 of the backlight the same direction as the scattering axis direction AX1 of the anisotropic scattering member 27. This can further increase the luminance produced by the backlight on the display surface of the transflective LCD device 1. The anisotropic scattering member 27 can scatter the backlight emitted toward a direction along the scattering axis direction AX1 and exiting from the surface on the display side of the anisotropic scattering member 27. As a result, the transflective LCD device 1 can increase the luminance produced by the backlight, thereby increasing the contrast on the display surface. The transflective LCD device 1 can reduce the directional dependence of the backlight, thereby further increasing the visibility.

Figure 15A:
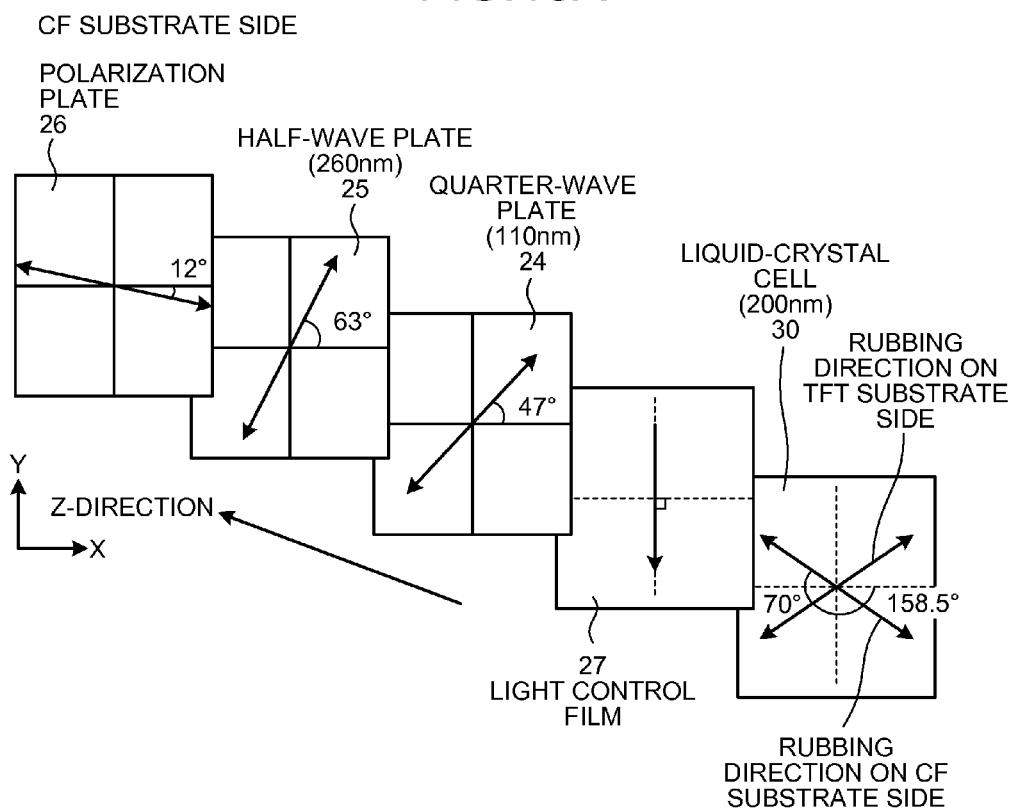
FIG. 15A is a schematic view illustrating an example of optical design on the CF substrate side of the transflective LCD device.
Figure 15B:
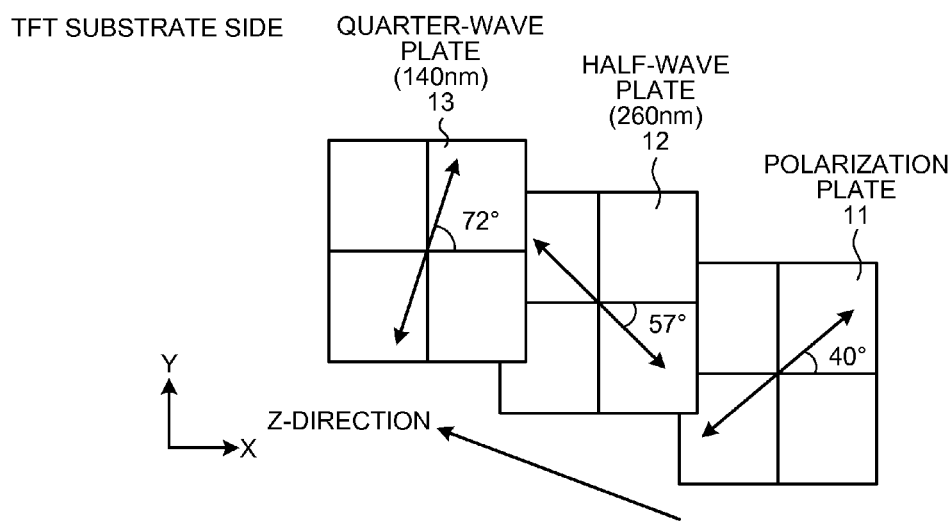
FIG. 15B is a schematic view illustrating an example of optical design on the TFT substrate side of the transflective LCD device.

FIG. 15A is a schematic view illustrating an example of optical design on the CF substrate side of the transflective LCD device. FIG. 15B is a schematic view illustrating an example of optical design on the TFT substrate side of the transflective LCD device. FIG. 15A and FIG. 15B illustrate axial directions of components of the first panel unit 10, the liquid crystal cell (liquid crystal layer 30), and components of the second panel unit 20. Specifically, FIG. 15B illustrates the axial directions of the first panel unit 10 (TFT substrate), including an absorption axis direction of the polarization plate 11, a stretching axis direction of the half wave plate 12, and a stretching axis direction of the quarter wave plate 13. FIG. 15A illustrates the axial directions of the second panel unit 20 (CF substrate), including rubbing directions of the liquid crystal cell on the TFT substrate side and the CF substrate side, a slow axis direction of the anisotropic scattering member 27, a stretching axis direction of the quarter wave plate 24, a stretching axis direction of the half wave plate 25, and an absorption axis direction of the polarization plate 26.

<2. Electronic Apparatuses>

The transflective LCD device 1 according to the present disclosure is applicable to display units (display devices) of any types of electronic apparatuses that display a video signal received by the electronic apparatuses or a video signal generated in the electronic apparatuses as an image or video.

The transflective LCD device according to the present disclosure is preferably applied to display units (display devices) of portable electronic apparatuses frequently used outdoors among all types of electronic apparatuses. Examples of the portable electronic apparatuses include, but are not limited to, portable information apparatuses, such as digital cameras, video cameras, personal digital assistants (PDA), game machines, notebook personal computers, and electronic books, portable communication apparatuses, such as mobile phones, etc.

As is clear from the description of the embodiment, the transflective LCD device according to the present disclosure can perform transmissive display while maintaining reflective display performance equivalent to that of a reflective display device. As a result, the transflective LCD device according to the present disclosure can fully exhibit the characteristics of a reflective LCD device in which less power consumption is required and the screen is easy to see under a bright environment. By applying the transflective LCD device according to the present disclosure to a display unit of any types of electronic apparatuses, specifically, of portable electronic apparatuses, it is possible to significantly reduce power consumption of the portable electronic apparatuses.

The following describes electronic apparatuses provided with the transflective LCD device 1 according to the present disclosure as a display unit, that is, specific examples of an electronic apparatus according to the present disclosure.

Figure 16A:
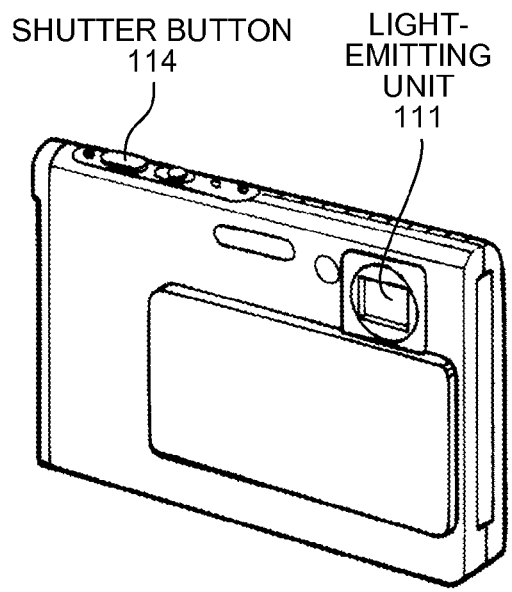
FIG. 16A is a perspective view illustrating an appearance of a digital camera to which the present disclosure is applied.
Figure 16B:
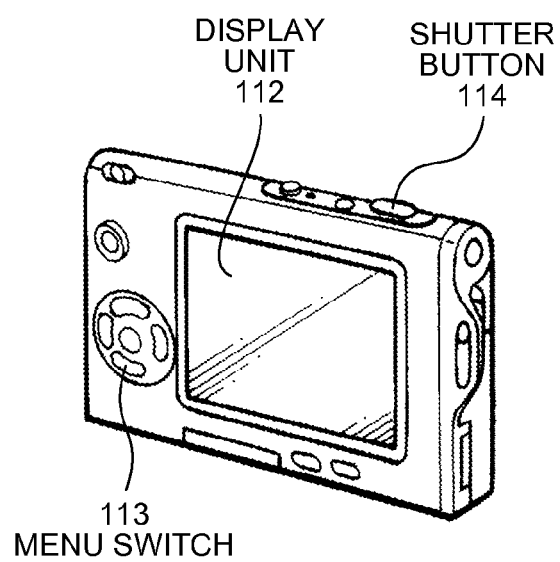
FIG. 16B is another perspective view illustrating the appearance of the digital camera to which the present disclosure is applied.

FIG. 16A is a perspective view illustrating an appearance of a digital camera to which the present disclosure is applied viewed from the front side. FIG. 16B is a perspective view illustrating the appearance of the digital camera viewed from the rear side. The digital camera according to the present application example includes a light-emitting unit 111 that outputs flashlight, a display unit 112, a menu switch 113, and a shutter button 114. The digital camera is manufactured by applying the transflective LCD device 1 according to the present disclosure to the display unit 112.

Figure 17:
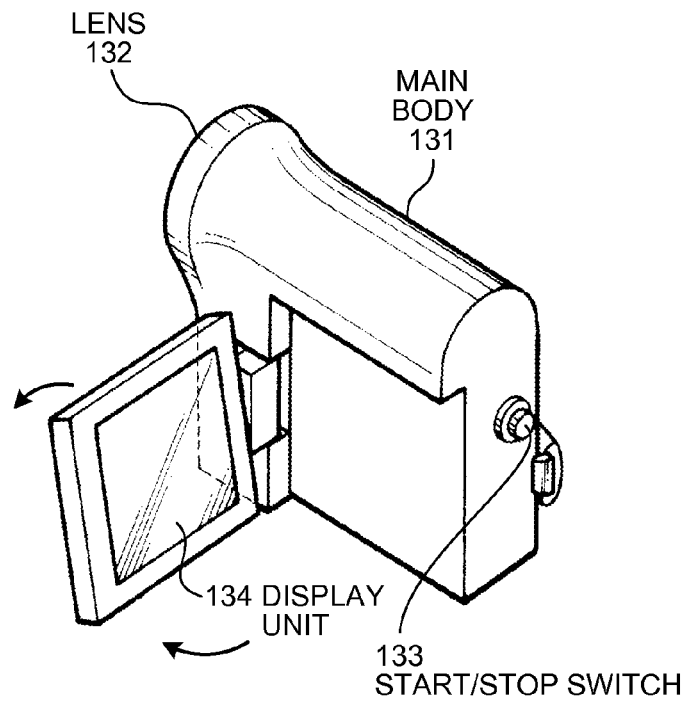
FIG. 17 is a perspective view illustrating an appearance of a video camera to which the present disclosure is applied.

FIG. 17 is a perspective view illustrating an appearance of a video camera to which the present disclosure is applied. The video camera according to the present application example includes a main body 131, a lens 132 arranged on the side surface facing the front to photograph a subject, a start/stop switch 133 used in photographing, and a display unit 134. The video camera is manufactured by applying the transflective LCD device 1 according to the present disclosure to the display unit 134.

Figure 18:
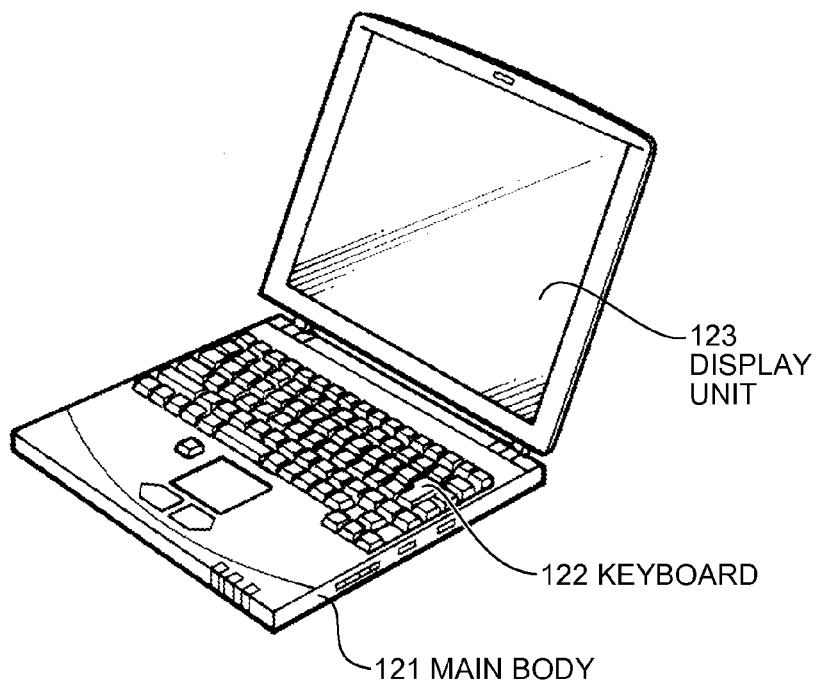
FIG. 18 is a perspective view illustrating an appearance of a notebook personal computer to which the present disclosure is applied.

FIG. 18 is a perspective view illustrating an appearance of a notebook personal computer to which the present disclosure is applied. The notebook personal computer according to the present application example includes a main body 121, a keyboard 122 operated when inputting characters and the like, and a display unit 123 that displays an image. The notebook personal computer is manufactured by applying the transflective LCD device 1 according to the present disclosure to the display unit 123.

Figure 19A:
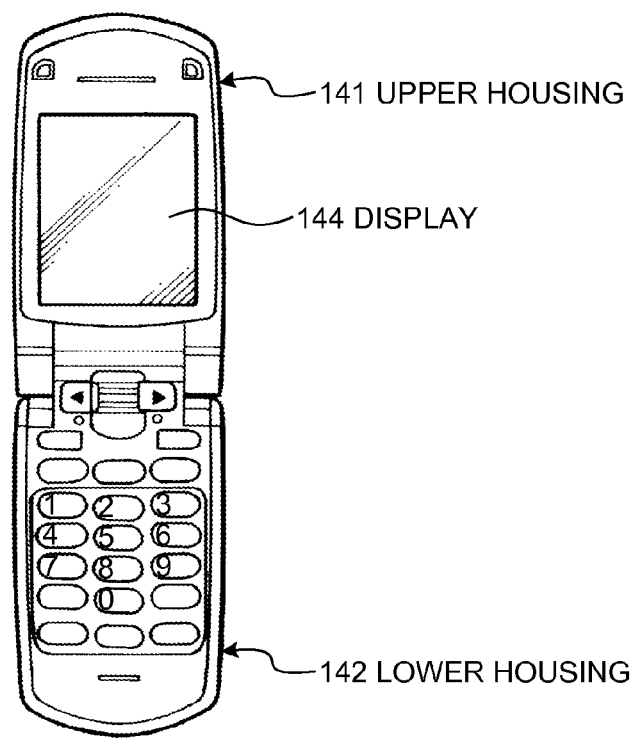
FIG. 19A is a front view illustrating a mobile phone to which the present disclosure is applied in an unfolded state.
Figure 19B:
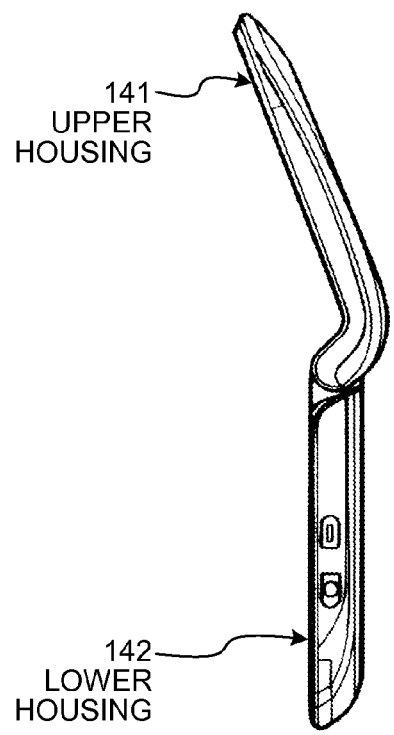
FIG. 19B is a side view illustrating the mobile phone to which the present disclosure is applied.
Figure 19C:
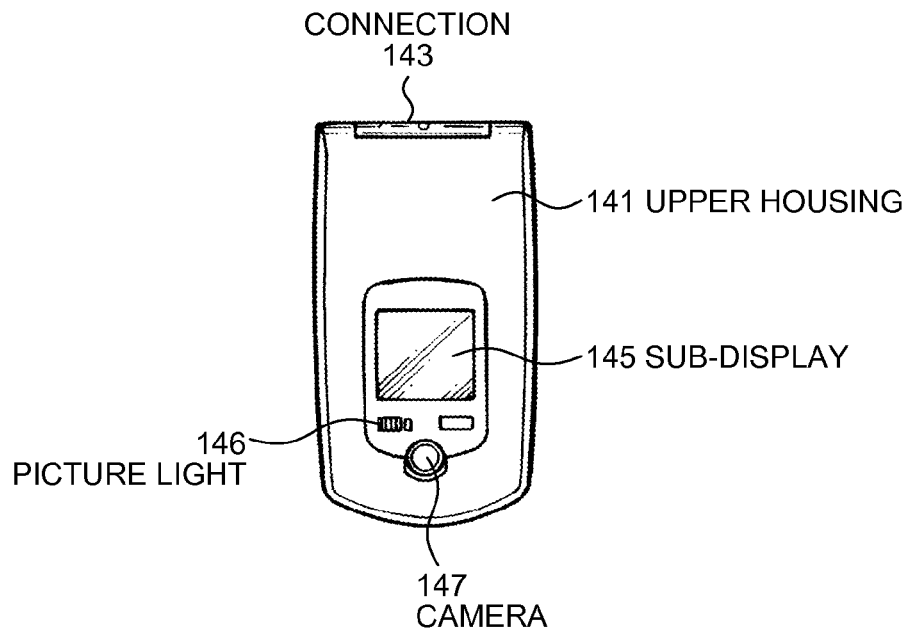
FIG. 19C is a front view illustrating the mobile phone to which the present disclosure is applied in a folded state.
Figure 19D:
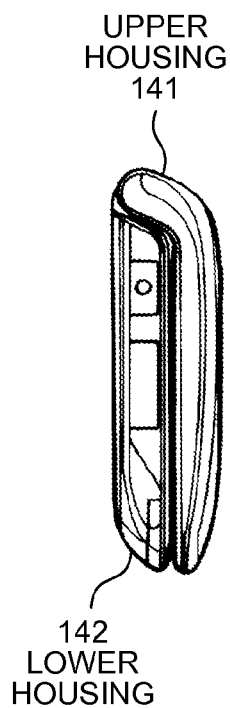
FIG. 19D is a left side view illustrating the mobile phone to which the present disclosure is applied.
Figure 19E:
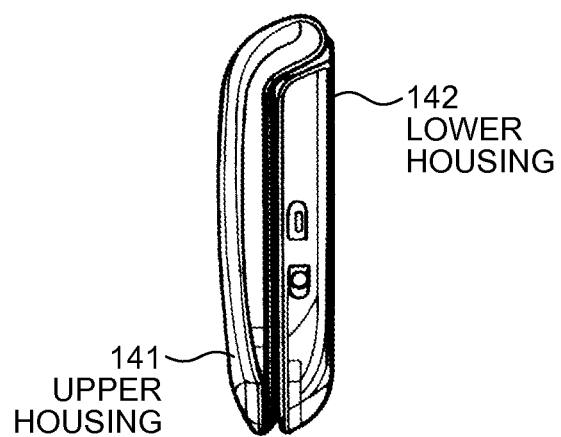
FIG. 19E is a right side view illustrating the mobile phone to which the present disclosure is applied.
Figure 19F:
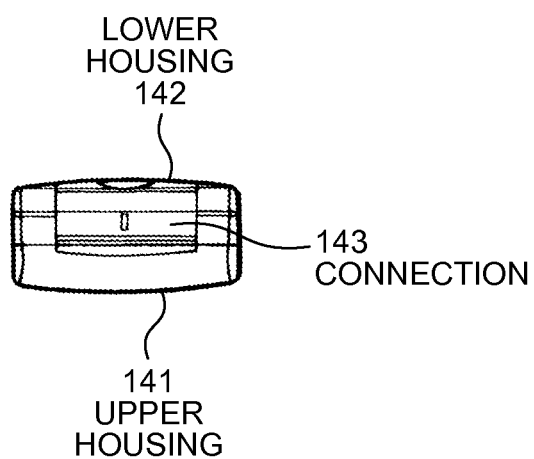
FIG. 19F is a top view illustrating the mobile phone to which the present disclosure is applied.
Figure 19G:
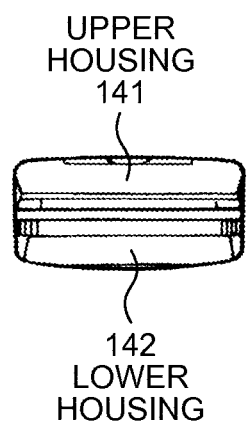
FIG. 19G is a bottom view illustrating the mobile phone to which the present disclosure is applied.

FIG. 19A to FIG. 19G are views illustrating an appearance of a portable communication apparatus, such as a mobile phone, to which the present disclosure is applied. FIG. 19A is a front view illustrating the mobile phone in an unfolded state, and FIG. 19B is a side view. FIG. 19C is a front view illustrating the mobile phone in a folded state, FIG. 19D is a left side view, FIG. 19E is a right side view, FIG. 19F is a top view, and FIG. 19G is a bottom view.

The mobile phone according to the present application example includes an upper housing 141, a lower housing 142, a connection (a hinge in this example) 143, a display 144, a sub-display 145, a picture light 146, and a camera 147. The mobile phone according to the present application example is manufactured by applying the transflective LCD device 1 according to the present disclosure to the display 144 and/or the sub-display 145.

According to the present disclosure, it is possible to reduce the blurring of images and reduce the directional dependency of light by directing the scattering center of the anisotropic scattering member disposed between the second substrate and the polarization plate to the same direction as the main view angle direction. Thereby, the visibility can be improved.

<3. Configuration of Present Disclosure>

The present disclosure can employ the following configurations.

(1) A liquid crystal display device comprising:
a first substrate provided with a reflective electrode;
a second substrate provided with a transparent electrode, the transparent electrode oppositely disposed to the reflective electrode;
a liquid crystal layer disposed between the first substrate and the second substrate;
a polarization plate oppositely disposed to the first substrate with an interposition of the second substrate therebetween; and
an anisotropic scattering member disposed between the second substrate and the polarization plate, wherein
a main view angle direction is set as a predetermined direction intersecting a display surface,
the anisotropic scattering member has a scattering center and scatters light traveling along a scattering axis direction which is a direction having a predetermined angle range centered around the scattering center,
the scattering axis direction coincides with the main view angle direction.

(2) The liquid crystal display device according to (1), wherein
the predetermined angle range is an angle range with an inclined angle within plus or minus 20 degrees relative to the scattering center.

(3) The liquid crystal display device according to (1), further comprising
a backlight unit oppositely disposed to the second substrate with an interposition of the first substrate therebetween, the backlight unit emitting backlight toward the first substrate, wherein
the backlight unit includes a light guiding plate opposite to the first substrate, and a light source unit that emits the backlight from a side direction of the light guiding plate,
a traveling direction of the backlight emitted from the light source unit and traveling in the light guiding plate is the same as the scattering axis direction when viewed from a direction along which the first substrate and the light guiding plate face each other.

(4) The liquid crystal display device according to (3), wherein
the backlight unit collects the backlight to be emitted toward the first substrate, and
the backlight unit inclines an emitting direction of the collected backlight toward a side toward which the scattering axis direction is also inclined relative to a normal line direction of the display surface.

(5) The liquid crystal display device according to (1), further comprising
a backlight unit oppositely disposed to the second substrate with an interposition of the first substrate, the backlight unit emitting backlight toward the first substrate, wherein
the backlight unit collects the backlight to be emitted toward the first substrate, and
the backlight unit inclines an emitting direction of the collected backlight toward a side toward which the scattering axis direction is also inclined relative to a normal line direction of the display surface.

(6) An electronic apparatus provided with the liquid crystal display device according to (1).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
a first substrate provided with a reflective electrode;
a second substrate provided with a transparent electrode, the transparent electrode oppositely disposed to the reflective electrode;
a liquid crystal layer disposed between the first substrate and the second substrate;
a polarization plate oppositely disposed to the first substrate with an interposition of the second substrate therebetween;
an anisotropic scattering member disposed between the second substrate and the polarization plate; and a backlight unit oppositely disposed to the second substrate with an interposition of the first substrate therebetween the backlight unit emitting backlight toward the first substrate, wherein a main view angle direction is set as a predetermined direction intersecting a display surface, the anisotropic scattering member has a scattering center and scatters light traveling along a scattering axis direction which is a direction having a predetermined angle range centered around the scattering center, the scattering axis direction coincides with the main view angle direction, backlight from the backlight unit passes through gaps between a plurality of the reflective electrodes in a first backlight direction, reflected light on the reflective electrode travels in a reflected light direction the first backlight direction and the reflected light direction incline toward the scattering axis direction relative to a normal line direction of the display surface, and an angle between the first backlight direction and the normal line direction are the same as an angle between the reflected light direction and the normal line direction.

2. The liquid crystal display device according to claim 1, wherein the predetermined angle range is an angle range with an inclined angle within plus or minus 20 degrees relative to the scattering center.

3. The liquid crystal display device according to claim 1, wherein the backlight unit includes a light guiding plate opposite to the first substrate, and a light source unit that emits the backlight from a side direction of the light guiding plate, and wherein a second backlight direction in which the backlight emitted from the light source unit travels in the light guiding plate is the same as the scattering axis direction when viewed from the normal line direction.

4. The liquid crystal display device according to claim 3, wherein the backlight unit collects the backlight to be emitted toward the first substrate, and the backlight unit inclines an emitting direction of the collected backlight toward the scattering axis direction relative to the normal line direction.

5. The liquid crystal display device according to claim 1, wherein the backlight unit collects the backlight to be emitted toward the first substrate, and the backlight unit inclines an emitting direction of the collected backlight toward the scattering axis direction relative to the normal line direction.

6. The liquid crystal display device according to claim 1, wherein the backlight unit includes a light guiding plate opposite to the first substrate, and a light source unit that emits the backlight from a side direction of the light guiding plate;

a second backlight direction in which the backlight emitted from the light source unit and travels in the light guiding plate is opposite to the scattering axis direction when viewed from the normal line direction;

the second backlight direction is opposite to the main angle direction when viewed from the normal line direction.

7. The liquid crystal display device according to claim 1, wherein the backlight unit includes a light guiding plate opposite to the first substrate, and a light source unit that emits the backlight from a side direction of the light guiding plate, a second backlight direction in which the backlight emitted from the light source unit travels in the light guiding plate is opposite to an emitting direction of backlight toward the first substrate when viewed from the normal line direction.

8. An electronic apparatus provided with the liquid crystal display device, the liquid crystal display device comprising:

a first substrate provided with a reflective electrode;

a second substrate provided with a transparent electrode, the transparent electrode oppositely disposed to the reflective electrode;

a liquid crystal layer disposed between the first substrate and the second substrate;

a polarization plate oppositely disposed to the first substrate with an interposition of the second substrate therebetween;

an anisotropic scattering member disposed between the second substrate and the polarization plate; and a backlight unit oppositely disposed to the second substrate with an interposition of the first substrate therebetween the backlight unit emitting backlight toward the first substrate wherein a main view angle direction is set as a predetermined direction intersecting a display surface, the anisotropic scattering member has a scattering center and scatters light traveling along a scattering axis direction which is a direction having a predetermined angle range centered around the scattering center, the scattering axis direction coincides with the main view angle direction, backlight from the backlight unit passes through gaps between a plurality of the reflective electrodes in a first backlight direction, reflected light on the reflective electrode travels in a reflected light direction the first backlight direction and the reflected light direction incline toward the scattering axis direction relative to a normal line direction of the display surface, and an angle between the first backlight direction and the normal line direction are the same as an angle between the reflected light direction and the normal line direction.

9. The electronic apparatus according to claim 8, wherein the predetermined angle range is an angle range with an inclined angle within plus or minus 20 degrees relative to the scattering center.

10. The electronic apparatus according to claim 8, wherein the backlight unit includes a light guiding plate opposite to the first substrate, and a light source unit that emits the backlight from a side direction of the light guiding plate, a second backlight direction in which the backlight emitted from the light source unit travels in the light guiding plate is the same as the scattering axis direction when viewed from the normal line direction.

11. The electronic apparatus according to claim 10, wherein the backlight unit collects the backlight to be emitted toward the first substrate, and the backlight unit inclines an emitting direction of the collected backlight toward the scattering axis direction relative to the normal line direction.

12. The electronic apparatus according to claim 8, wherein the backlight unit collects the backlight to be emitted toward the first substrate, and the backlight unit inclines an emitting direction of the collected backlight toward the scattering axis direction relative to the normal line direction.

13. The electronic apparatus according to claim 8, wherein the backlight unit includes a light guiding plate opposite to the first substrate, and a light source unit that emits the backlight from a side direction of the light guiding plate;

a second backlight direction in which the backlight emitted from the light source unit and travels in the light guiding plate is opposite to the scattering axis direction when viewed from the normal line direction;

the second backlight direction is opposite to the main angle direction when viewed from the normal line direction.

14. The electronic apparatus according to claim 8, wherein the backlight unit includes a light guiding plate opposite to the first substrate, and a light source unit that emits the backlight from a side direction of the light guiding plate;

a second backlight direction in which the backlight emitted from the light source unit travels in the light guiding plate is opposite to an emitting direction of backlight toward the first substrate when viewed from the normal line direction.

* * * * *